United States Patent
Friedrichs et al.

(10) Patent No.: US 9,088,601 B2
(45) Date of Patent: Jul. 21, 2015

(54) METHOD AND APPARATUS FOR DETECTING MALICIOUS SOFTWARE THROUGH CONTEXTUAL CONVICTIONS, GENERIC SIGNATURES AND MACHINE LEARNING TECHNIQUES

(75) Inventors: Oliver Friedrichs, Woodside, CA (US); Alfred Huger, Calgary (CA); Adam J. O'Donnell, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/308,539

(22) Filed: Nov. 30, 2011

(65) Prior Publication Data

US 2012/0210423 A1     Aug. 16, 2012

Related U.S. Application Data

(60) Provisional application No. 61/418,532, filed on Dec. 1, 2012, provisional application No. 61/418,514, filed on Dec. 1, 2012, provisional application No. 61/418,547, filed on Dec. 1, 2012, provisional application No. 61/418,580, filed on Dec. 1, 2012.

(51) Int. Cl.
| | |
|---|---|
| *G06F 12/16* | (2006.01) |
| *H04L 29/06* | (2006.01) |
| *G06F 21/56* | (2013.01) |
| *G06F 11/00* | (2006.01) |
| *G06F 12/14* | (2006.01) |
| *G08B 23/00* | (2006.01) |

(52) U.S. Cl.
CPC .......... *H04L 63/1416* (2013.01); *G06F 21/564* (2013.01)

(58) Field of Classification Search
None
See application file for complete search history.

(56) References Cited

U.S. PATENT DOCUMENTS

| | | | |
|---|---|---|---|
| 7,010,696 B1 | 3/2006 | Cambridge et al. |
| 7,103,913 B2 | 9/2006 | Arnold et al. |
| 7,140,040 B2 | 11/2006 | McBrearty et al. |
| 7,467,410 B2 | 12/2008 | Graham et al. |
| 7,475,405 B2 | 1/2009 | Manganaris et al. |
| 7,487,544 B2 | 2/2009 | Schultz et al. |
| 7,690,037 B1 | 3/2010 | Hartmann |
| 7,779,262 B2 | 8/2010 | Kim et al. |

(Continued)

FOREIGN PATENT DOCUMENTS

| | | |
|---|---|---|
| EP | 2199941 A2 | 6/2010 |
| EP | 2199941 A3 | 4/2012 |
| WO | 2010115959 A1 | 10/2010 |

OTHER PUBLICATIONS

International Search Report and Written Opinion in counterpart International Application No. PCT/US2011/062957, mailed Jun. 24, 2014, 8 pages.

(Continued)

*Primary Examiner* — Shin-Hon Chen

(57) ABSTRACT

Novel methods, components, and systems that enhance traditional techniques for detecting malicious software are presented. More specifically, methods, components, and systems that use important contextual information from a client system (such as recent history of events on that system), machine learning techniques, the automated deployment of generic signatures, and combinations thereof, to detect malicious software. The disclosed invention provides a significant improvement with regard to automation compared to previous approaches.

10 Claims, 15 Drawing Sheets

(56) References Cited

U.S. PATENT DOCUMENTS

| | | |
|---|---|---|
| 7,853,795 B2 | 12/2010 | Dick et al. |
| 7,945,957 B2 | 5/2011 | Dettinger et al. |
| 8,112,801 B2 | 2/2012 | Abdel-Aziz et al. |
| 8,127,358 B1 | 2/2012 | Lee |
| 8,136,149 B2 | 3/2012 | Freund |
| 8,161,548 B1 | 4/2012 | Wan |
| 8,214,899 B2 | 7/2012 | Chien |
| 8,266,698 B1 * | 9/2012 | Seshardi et al. ............... 726/24 |
| 8,347,386 B2 | 1/2013 | Mahaffey et al. |
| 8,365,283 B1 | 1/2013 | Satish et al. |
| 2004/0049698 A1 | 3/2004 | Ott et al. |
| 2006/0026675 A1 | 2/2006 | Cai et al. |
| 2006/0037077 A1 | 2/2006 | Gadde et al. |
| 2006/0037080 A1 | 2/2006 | Maloof |
| 2006/0126522 A1 | 6/2006 | Oh |
| 2006/0282660 A1 | 12/2006 | Varghese et al. |
| 2007/0016953 A1 | 1/2007 | Morris et al. |
| 2007/0150954 A1 | 6/2007 | Shon |
| 2008/0127336 A1 | 5/2008 | Sun et al. |
| 2008/0222717 A1 | 9/2008 | Rothstein et al. |
| 2009/0049549 A1 | 2/2009 | Park et al. |
| 2009/0089869 A1 * | 4/2009 | Varghese ........................ 726/7 |
| 2009/0248696 A1 | 10/2009 | Rowles et al. |
| 2009/0254992 A1 | 10/2009 | Schultz et al. |
| 2009/0282476 A1 | 11/2009 | Nachenberg et al. |
| 2009/0300761 A1 | 12/2009 | Park et al. |
| 2009/0319659 A1 * | 12/2009 | Terasaki et al. ............... 709/224 |
| 2010/0017877 A1 | 1/2010 | Cooley et al. |
| 2010/0058432 A1 | 3/2010 | Neystadt et al. |
| 2010/0100963 A1 * | 4/2010 | Mahaffey ........................ 726/25 |
| 2010/0169972 A1 | 7/2010 | Kuo et al. |
| 2010/0281248 A1 | 11/2010 | Lockhart et al. |
| 2011/0047620 A1 * | 2/2011 | Mahaffey et al. ............... 726/23 |
| 2011/0208714 A1 | 8/2011 | Soukal et al. |
| 2012/0117648 A1 | 5/2012 | Kallio et al. |
| 2012/0124666 A1 | 5/2012 | Kim et al. |
| 2012/0158626 A1 | 6/2012 | Zhu et al. |
| 2012/0255004 A1 | 10/2012 | Sallam |
| 2012/0331556 A1 | 12/2012 | Alperovitch et al. |

OTHER PUBLICATIONS

Extended European Search Report in European Application No. 11844348.0, mailed Jun. 24, 2014, 8 pages.

* cited by examiner

METHOD AND APPARATUS FOR DETECTING MALICIOUS SOFTWARE THROUGH CONTEXTUAL CONVICTIONS, GENERIC SIGNATURES AND MACHINE LEARNING TECHNIQUES

FIELD OF THE INVENTION

The present invention relates to the security of general purpose computing devices and more specifically to the detection of malicious software (malware) on a general purpose computing device.

BACKGROUND OF THE INVENTION

It is known in the art that each day, many tens of thousands of new malicious software programs are discovered. These programs can compromise the security of general computing devices. Possible security violations include, but are not limited to, the theft of data from the system, the usurping of the system for other nefarious purpose (like sending spam email), and, in general, the remote control of the system (by someone other than its owner) for other malicious actions.

One popular technique in the art for detecting malicious software comprises the following steps:
  a. Establishing through some independent means that the application is malicious (e.g., by having a human being manually analyze it and pinpoint the presence of one or more malicious behaviors).
  b. Computing a hash or fingerprint of this software. A hash is a mathematical transformation that takes the underlying binary contents of a software application and produces a relatively short string, with the idea being that two different applications will, with overwhelmingly high probability, have distinct fingerprint values. Common functions for performing this fingerprinting or hashing step include, but are not limited to, SHA-256, SHA-1, MD5, and others. Besides hash and fingerprint, another term used in the art to describe this transformation is a signature. For the purposes of this invention, the terms hash, fingerprint and signature will be used interchangeably. These terms are not synonymous with each other, but for the purposes of the invention described, the differences are immaterial.
  c. Publishing this hash so that it is accessible to end-users operating a general purpose computing device (for example, the hash can be posted to a blacklist of known malicious applications).
  d. Having the device compare this published fingerprint with the fingerprint of any new software applications that have arrived on the system.
  e. Applying a set of steps based on a given policy if the fingerprints match (e.g., blocking the installation of the application).

The technique just described suffers from the drawback that it only works when an application is determined to be malicious ahead of time. Put differently, it is a reactive approach. It is understood in the art that often times superficial changes to a malicious application will cause it to have a different fingerprint even though the underlying actions of the application continue to be malicious. In other words, the application will look ostensibly different from the outside, but underneath its operations will be identical (analogous to how a criminal can put on different disguises involving wigs and sunglasses, even though underneath it is the same person). If the file is modified, then the corresponding fingerprint might change. If the fingerprint changes, then it will no longer match the one that was initially established for the application, and consequently the application can potentially evade detection by any anti-malware technology that uses a reactive signature-based approach.

The recent explosion in malware instances appears to be a result of malware authors making frequent, but innocuous, changes to a smaller number of applications rather than creating entirely new applications.

To address this issue, one technique in the art involves developing what are known as generic signatures. These signatures are designed to be invariant to superficial changes in the underlying binary contents of a software application. If a malicious party only performs a restricted set of superficial changes to the binary, then the resulting hash value will not change. For example, one way to construct a generic signature would be to do the following. First, extract out structural properties of the file (such as the sizes of the different sections, the number of symbols, the entropy of the various sections). Second, normalize these values or put them in buckets. For example, if the size is between 0 bytes and 100 bytes, then it would belong in bucket one. If the size is between 100 and 200 bytes, it would belong in bucket two, and so on. Now, rather than using the original file to construct a signature, we could use the normalized structural features as the basis of the signature. The idea is that superficial changes to the file would likely yield little to no changes to the underlying structure of the file, and after normalization or bucketing, you would see no changes.

Consequently, a single generic signature can be used not only to detect a given base threat, but also be used to detect minor variations of that threat. To give a physical analogy that might help make the concept of a signature more clear, imagine you are trying to describe a criminal. You could do so by identifying very specific characteristics (such as hair color, eye color, what they were wearing when last seen, etc.). However, if the criminal wore a wig or had colored contact lenses on, then characteristics like hair or eye color would not be useful. If instead, one were to focus on structural attributes, such as the criminal's height, weight, build, race, etc., then even in the presence of disguises these attributes would be constant. Furthermore, if one were to normalize these attributes (e.g., saying he is approximately 6 feet tall rather than exactly 6 feet and 2 inches, or saying the he is heavyset rather than specifying a very specific build), you could potentially identify the criminal even if they wore platform shoes and baggy clothing.

However, it is known in the art that even generic signatures have shortcomings. These shortcomings include, but are not limited to the following:
  a. Creating generic signatures might require manual intervention. (For example, a human computer virus analyst may have to directly examine the binary contents of the software application and determine how a signature should be computed so that it is invariant to innocuous changes in the applications.) In the context of the human criminal analogy listed above, one might have to identify exactly which attributes are interesting, and what range of values they should take.
  b. Generic signatures are prone to false positives (i.e., a situation in which they incorrectly identify an application as malicious, even though it is in fact benign). Since generic signatures are designed to identify not just a single base software application, but also other applications that are related to it, there is a risk that a legitimate application might inadvertently be identified as malicious because its underlying binary contents bear some similarity to the malicious application off of which the signature was based. In the context of the human criminal analogy given above, if we were too vague in the description—then every 6 foot tall heavy-set person might fit the description of the criminal.

There is, accordingly, a need in the art to develop methods, components, and systems for detecting malicious software in a way that addresses the above limitations. The present invention addresses these needs by providing a) an improved method for using generic signatures by using automation to reduce the amount of manual analysis and the risk of false positives in the system, b) a method of using contextual information, such as the presence of other recent (malicious) activity on a system, to formulate a more accurate picture regarding whether or not a particular software application running on the system might be malicious, c) a method of using machine learning technologies to train a corpus to develop a machine learning model for the evaluation of applications of interest, and d) methods including two or more of methods (a) through (c).

SUMMARY OF THE INVENTION

According to one aspect of the present invention, a system is provided that uses contextual information from a client system together with more aggressive detection engines to determine if a given software application is malicious. The system comprises the following phases. First, a client encounters a software application for which it would like to know a disposition—that is whether the application is benign or malicious. The client extracts metadata about the application, including but not limited to, traditional fingerprints (like a SHA-256), generic signatures such as those used in the art by many Anti-Malware technologies, machine learning feature attributes, etc. The client also gathers additional contextual information. For example, recent infection history, applications running on the system, web sites visited, etc. This information is encoded, as appropriate, using any technique known in the art. Next, the information about the application as well as the contextual information is transmitted (if necessary over a network) to a server component. (This component need not be a remote server; instead the logic can reside on the client itself. To clarify the description, however, it helps to imagine a separate component that processes information transmitted by the client.) The server examines both the contextual information as well as the application information and makes a determination about the application (for example, that the application is safe to run). The server provides a response back to the client that encodes a recommendation for what the client should do. Finally, the client determines what actions to take, according to local policy, as a function of the server's.

According to another aspect of the present invention, a client component is provided that continuously gathers contextual information, optionally transmits this information to a server, and makes a determination with the possible help of a server about whether a given software application poses a threat. The determination utilizes traditional techniques for identifying a threat together with the contextual information. The contextual information may include, but is not limited to, applications recently installed on the system, information about recent threats found on the system as well as when those threats were found, any recent web sites the client visited, geographic location as well as Internet Protocol (IP) address of the client, and a client identifier. The client identifier is a sequence of symbols that can be used to identify a client for the purposes of being able to link different transactions by the same client from the perspective of a server.

According to another aspect of the present invention, a component is provided that can reside on either a client or a server, and includes logic that uses contextual information passed by the client to determine whether a given software application is malicious. The server can also use additional contextual information that can be gathered from a plurality of clients, such as the frequency and timing with which an application of interest is queried by other clients as well as the context of that application as described by other clients. Once that determination is made, a corresponding recommendation is determined, and is transmitted to the client.

According to another aspect of the present invention, the underlying method (executed on the client system) gathers contextual information from a client to assist in determining if a given software application of interest is a threat. Examples of underlying information include recent security events on the client (such as the detection of other malicious software or malware) or the presence of particular "risky" software applications on the system (such as peer-to-peer file sharing applications).

According to another aspect of the present invention, a method is provided that examines data about a given software application of interest together with contextual information associated with that application on a user system, and makes a determination about that application (such as whether the application is malicious and should be blocked or removed). The method might use a set of simple rules. For example, if the system has seen 10 threats in the last hour, and the present application has a 65% chance of being malicious based on another threat detection system, (e.g., one derived using machine learning techniques, or one using generic signatures), then determine the application is malicious (with the idea being that in the absence of any other information, having only a 65% chance of being right is typically insufficient to make a conclusive determination, but that with the addition of contextual information of 10 recent threats, the likelihood that the application is malicious is much greater). The method might also employ machine learning techniques to generate either a set of rules or generate a more generic model that effectively encodes additional rules.

According to one aspect of the present invention, a system is provided that can compute generic fingerprints for a given software application as well as determine if applications possessing that same generic fingerprint should be deemed malicious, in which case, a prescribed set of actions against that software would be taken.

According to another aspect of the present invention, a server-side component is provided that can perform the following steps: first, apply a mathematical transformation to a software application to produce a generic fingerprint; second, record the fingerprint of said software application; third, apply one or more steps that can be executed on a general purpose computing device to determine if that generic signature should be deemed malicious; and fourth, communicate that information to a client component.

According to another aspect of the present invention, a client-side component is provided that can: first, compute a generic fingerprint for a software application it encounters; second, transmit that generic fingerprint data to a server component (or can replicate those steps locally if it has knowledge of the server's relevant data and relevant logical operations); third, follow a prescribed set of actions provided by the server, such actions including, but not limited to: (1) Ignoring the application if it is deemed safe by other methods beyond the generic fingerprint; (2) Removing the application from the system if it is deemed unsafe; (3) transmitting the application to a possibly different server-side component for further processing and analysis.

According to another aspect of the present invention, a method is provided for identifying whether a given software application is a candidate for having a generic signature computed. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to another aspect of the present invention, a method is provided for identifying whether an application possessing a given generic signature should be deemed malicious (or clean) primarily on the basis of possessing that signature value. In one embodiment of the present invention, this method will be performed on the server by processing logic that may comprise hardware (e.g., circuitry, dedicated logic, etc.), software (such as is run on a general purpose computer system or a dedicated machine), or a combination of both. It is to be understood, however, that the choice of where and how the method is performed is not to be limited by the present description, and it should be apparent to a person of ordinary skill in the art that many such choices exist.

According to one aspect of the present invention, a system is provided that uses machine learning techniques to identify a software application as malicious. The system comprises the following phases. First, there is a training phase in which a corpus of training data is used to derive a model. The model takes as input a feature vector that can be derived by applying a mathematical transformation to a software application. Second, there is a feature extraction phase in which a client system can extract a feature vector from a potentially malicious software application and either evaluate it directly using the model or transmit it to a back-end server for evaluation. Third, there is an evaluation phase wherein the model is applied to the extracted feature vector to determine whether the application of interest is likely malicious or benign (optionally producing not just a binary classification but possibly a score that represents the likelihood of this distinction—e.g., a score from 0 to 100 where 0 represents that an application is with overwhelming likelihood clean and 100 means an application is with overwhelming likelihood malign). Fourth, based on this determination, an appropriate policy may be applied. According to another aspect of the present invention, one or more server-side components are presented that may perform the training phase. In one embodiment, the data used to derive the model can be taken directly from transaction logs of actual client systems that communicate with the server side component. The methods by which training can be done include, but are not limited to, Support Vector Machines, Neural Networks, Decision Trees, naive Bayes, Logistic Regression, and other techniques from supervised, semi-supervised, and unsupervised learning. The training or "model-derivation" aspect of the invention may be practiced with any of the above techniques so long as they can yield a method for classifying software applications. Once the training is complete and a model is derived, the server side component can automatically create a module that uses the model to evaluate the feature vectors of new software instances.

According to another aspect of the present invention, a client-side component is provided that may perform the following steps: first, extract relevant feature vector values from a software application; second, optionally compare these values to a local model to determine if the application is malicious or benign or requires further investigation; third, optionally compress the feature vector so that it can be encoded in with a small number of bytes; fourth, transmit the (compressed or uncompressed) feature vector to a server; fifth, apply a policy based on the server's response. The policy based on the server's response might include, but would not be limited to one or more options. First, if the application is conclusively malicious, the client side component may remove it from the system or block any installation attempt by the user. Second, if the application is possibly, but not conclusively malicious, the client side component may transmit a copy of the application itself to the server for subsequent more extensive processing and analysis. According to another aspect of the present invention, a server-side component is provided that may perform the following steps: first, receive a feature vector (that was transmitted by the client); second, optionally decompress this feature vector if it was compressed by the client; third, evaluate this feature vector and determine how likely it is to be malicious; fourth, transmit this information to the client together with optional instructions for how the client should respond. Note that in one embodiment of the present invention, the actual policy for how to handle different server responses can be stored on the client itself, and the server can provide a simple response. According to another aspect of the present invention, a method is provided for training a model that can be used to determine if a software application is potentially malicious. The method can potentially leverage actual in-field usage data. According to another aspect of the present invention, a method is provided for a client to extract a feature vector from a software application together with related contextual information on the system, (optionally) compress this information, and then transmit it to a server-side component. According to another aspect of the present invention, a server-side component is provided that can take a possibly compressed feature vector, decompress it if is compressed, evaluate the feature vector against a model, compare the results to those achieved from other methods for identifying malicious software, and then provide a disposition to a client.

According to another embodiment of the invention, two or more of the generic signatures, contextual convictions, or machine learning derived model are applied, at either or both of a client application and a server application, to determine whether a software application is malicious. According to this embodiment, a client application may perform two or more of the following steps: (i) extract a feature vector from said software application; (ii) extract metadata about the application and gather contextual information about a system on which the application may be installed; and (iii) computing a generic fingerprint for the application; then transmit the information related to data obtained to a server application. Once the server application process the information it will transmit a determination or related information back to the client application, and the client application may take an action with respect to the application based on the information received from the server component.

According to a related embodiment, the server application may receive from a client application two or more of the following: (i) a feature vector from said software application; (ii) metadata about the application and contextual information about a system on which the application may be installed; and (iii) a generic fingerprint for the application. Depending on what information is received, the server application will apply a machine-learning derived classification algorithm to a feature vector, if feature vector information is received from the client application; examine metadata concerning the software application and contextual information about the client system, if metadata and contextual information are received from the client system, and/or determine whether the generic signature should be deemed malicious, if a generic signature for the software application is received from the client. Once these steps are completed, the server application may make a determination as to whether the software application should be deemed malicious with regard to the client application and transmit information concerning the determination as to whether the software application should be deemed malicious to the client application.

DESCRIPTION OF THE DRAWINGS

The subsequent description of the preferred embodiments of the present invention refers to the attached drawings, wherein.

DETAILED DESCRIPTION OF THE INVENTION

Figure 1:
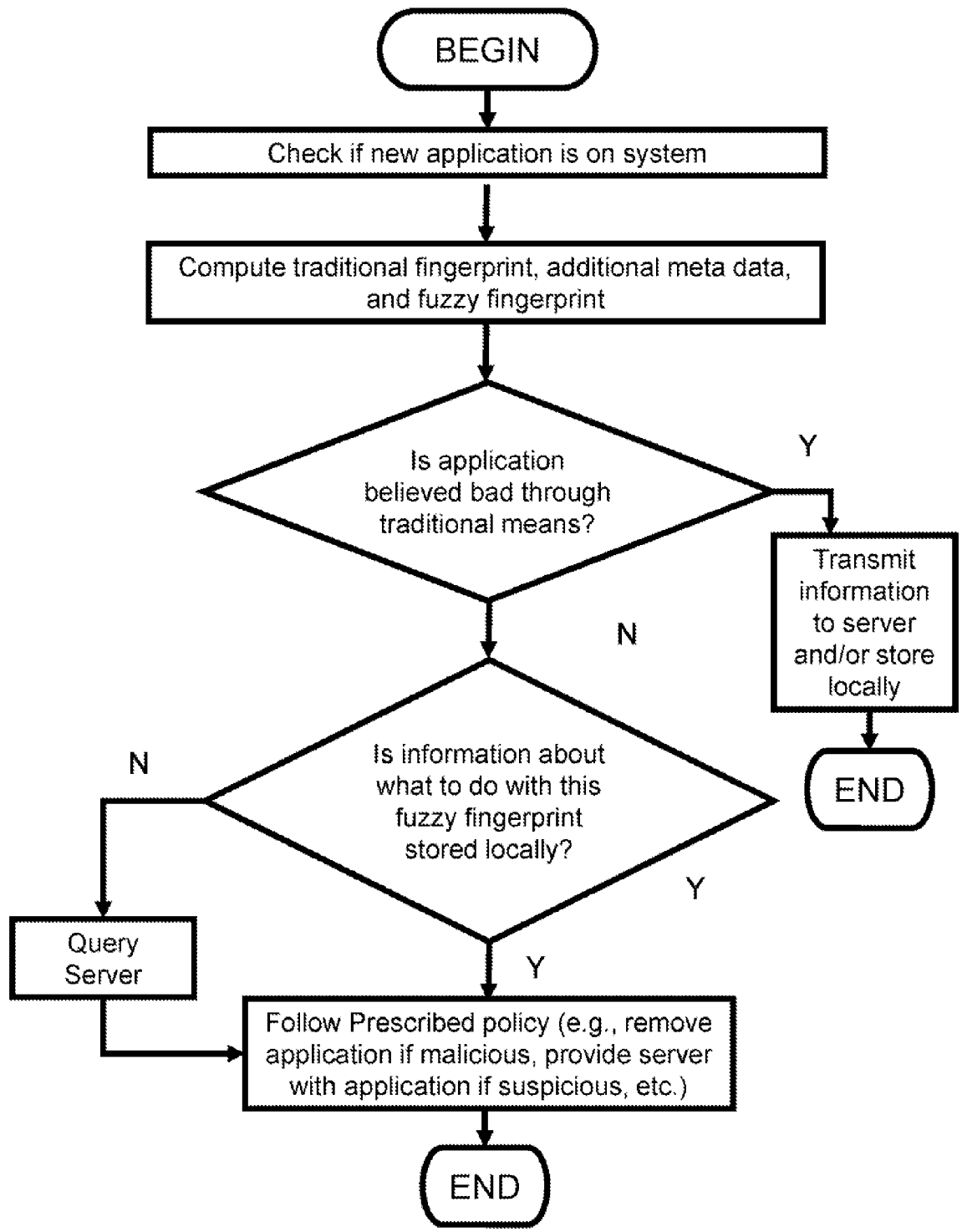
FIG. 1 represents a flowchart of the operation of a client in accordance with a generic signature embodiment of the present invention.
Figure 2:
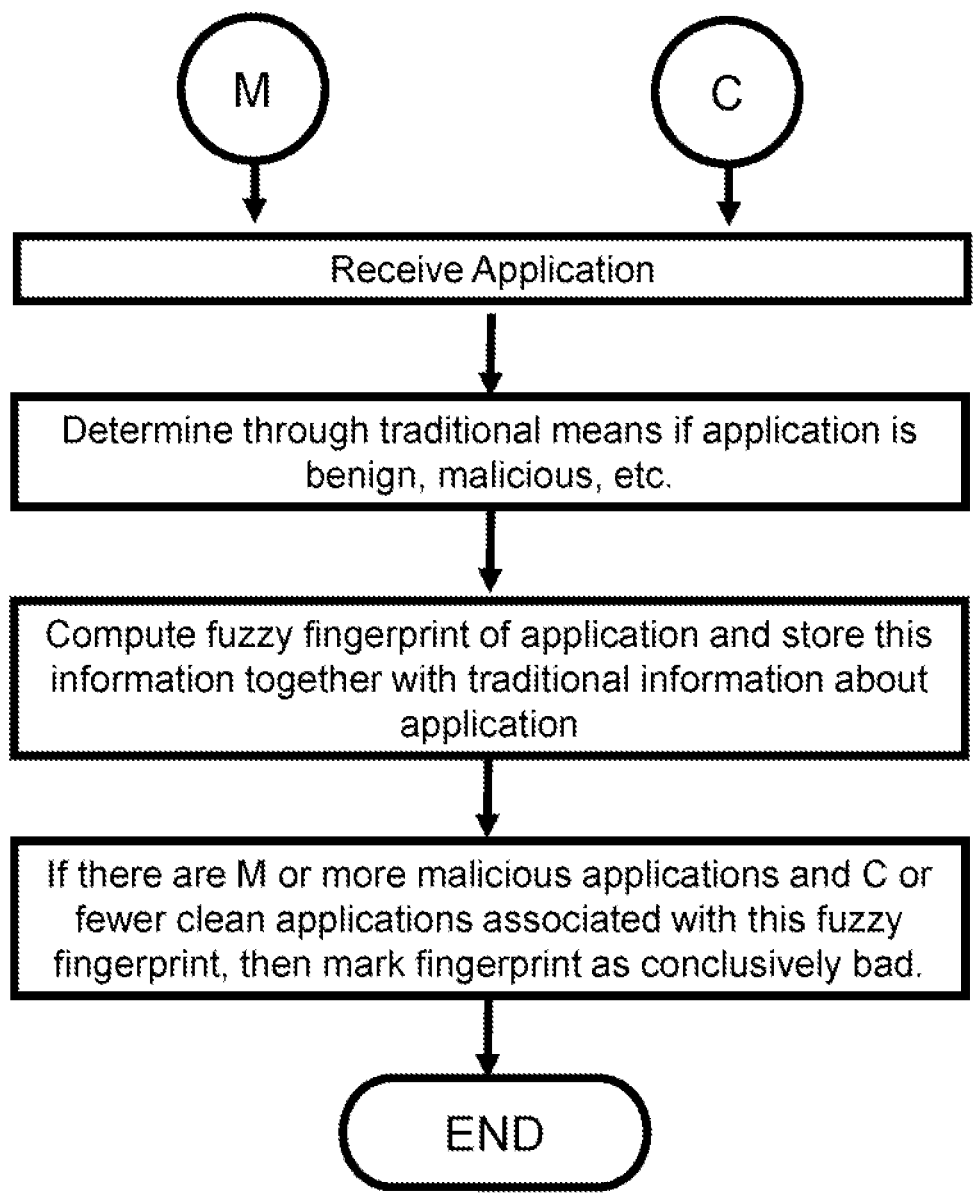
FIG. 2 represents a flowchart of a method for determining if a fuzzy fingerprint is conclusively bad in accordance with an aspect of the present invention.
Figure 3:
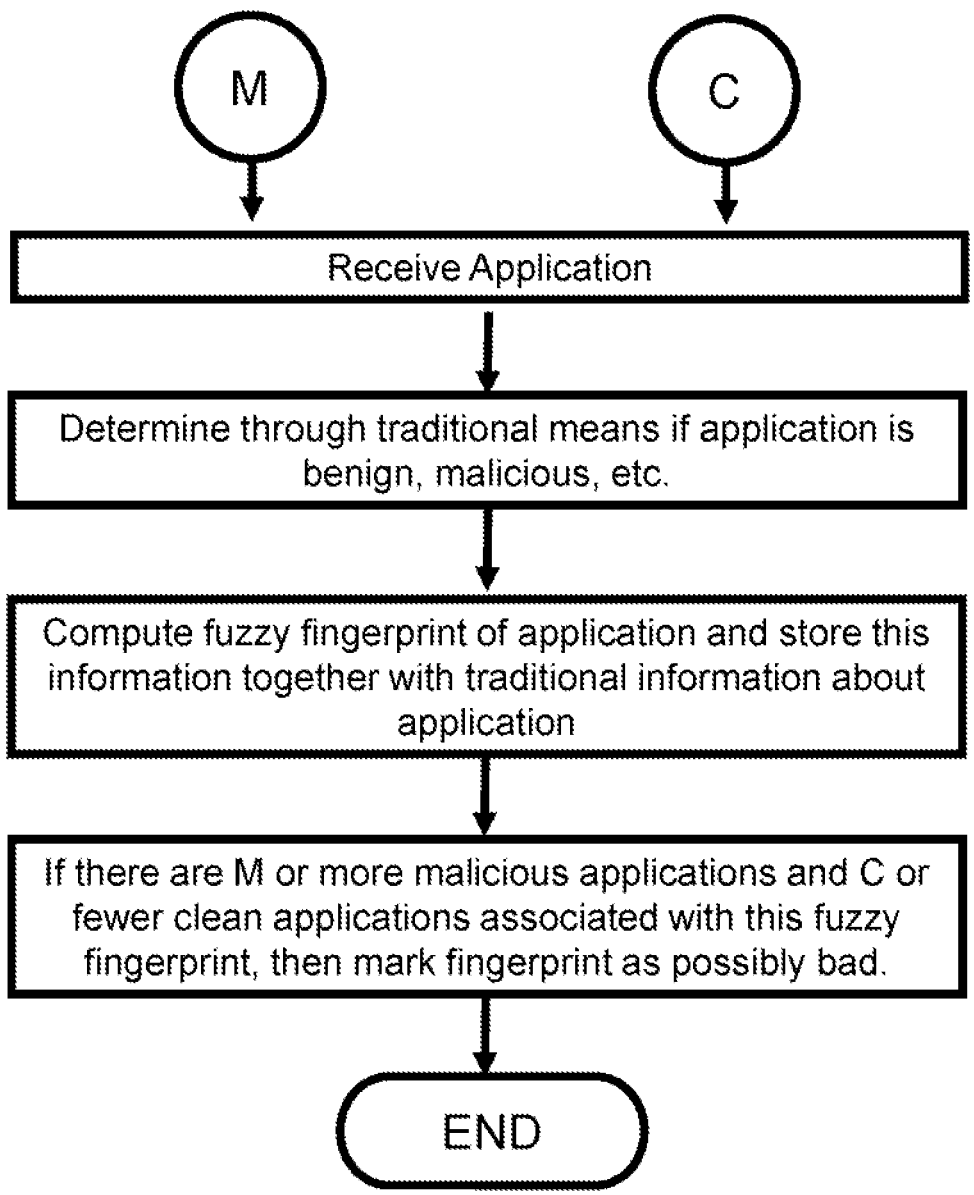
FIG. 3 represents a flowchart of a method for determining if a fuzzy fingerprint is possibly bad in accordance with an aspect of the present invention. Note that the steps of this method are largely identical to those for determining if an application is conclusively bad. The difference in the reduction to practice would be in the choice of values for the numeric parameters M and C. (To determine if an application is conclusively bad rather than just possibly bad, we would expect the value of M to be at least as big and the value of C to be at least as small.) It is expected that one of ordinary skill in the art can identify suitable values to use for these parameters.
Figure 4:
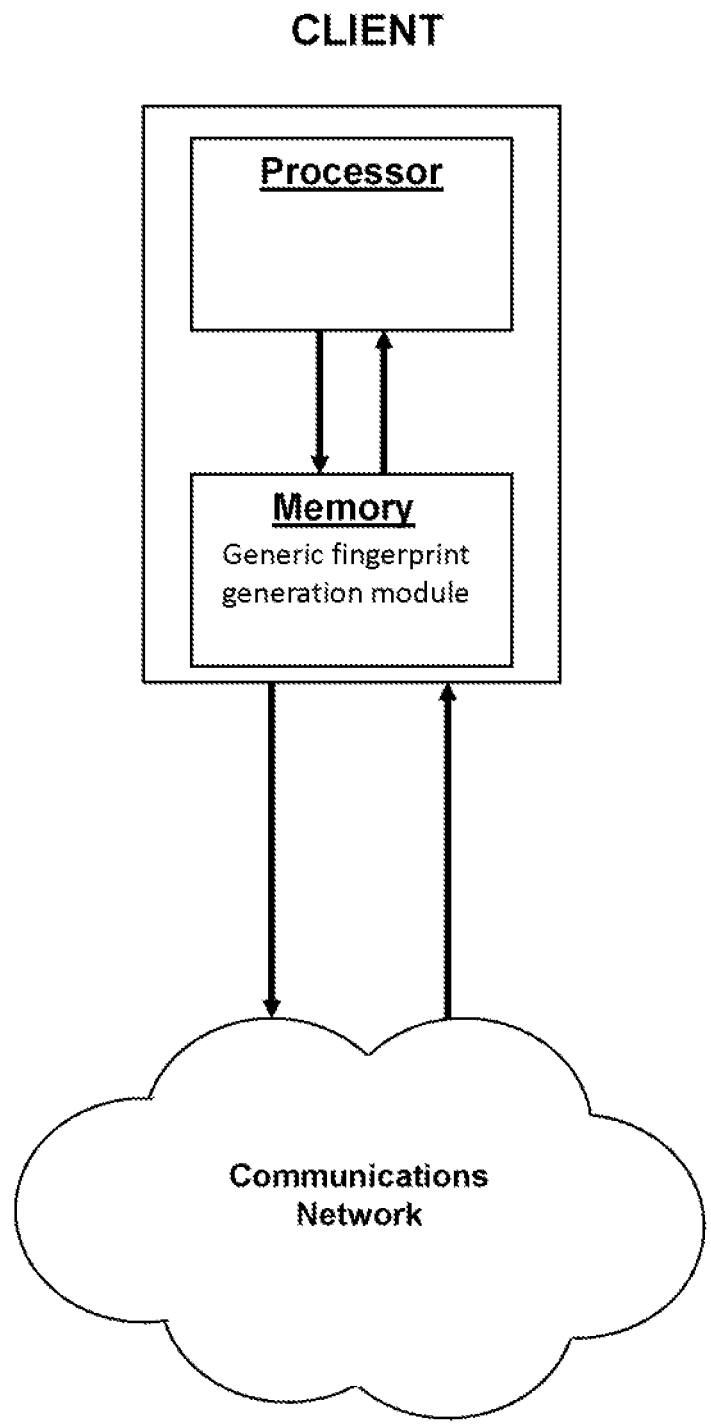
FIG. 4 is a client component including a generic fingerprint generation module in accordance with an embodiment of the present invention e.
Figure 5:
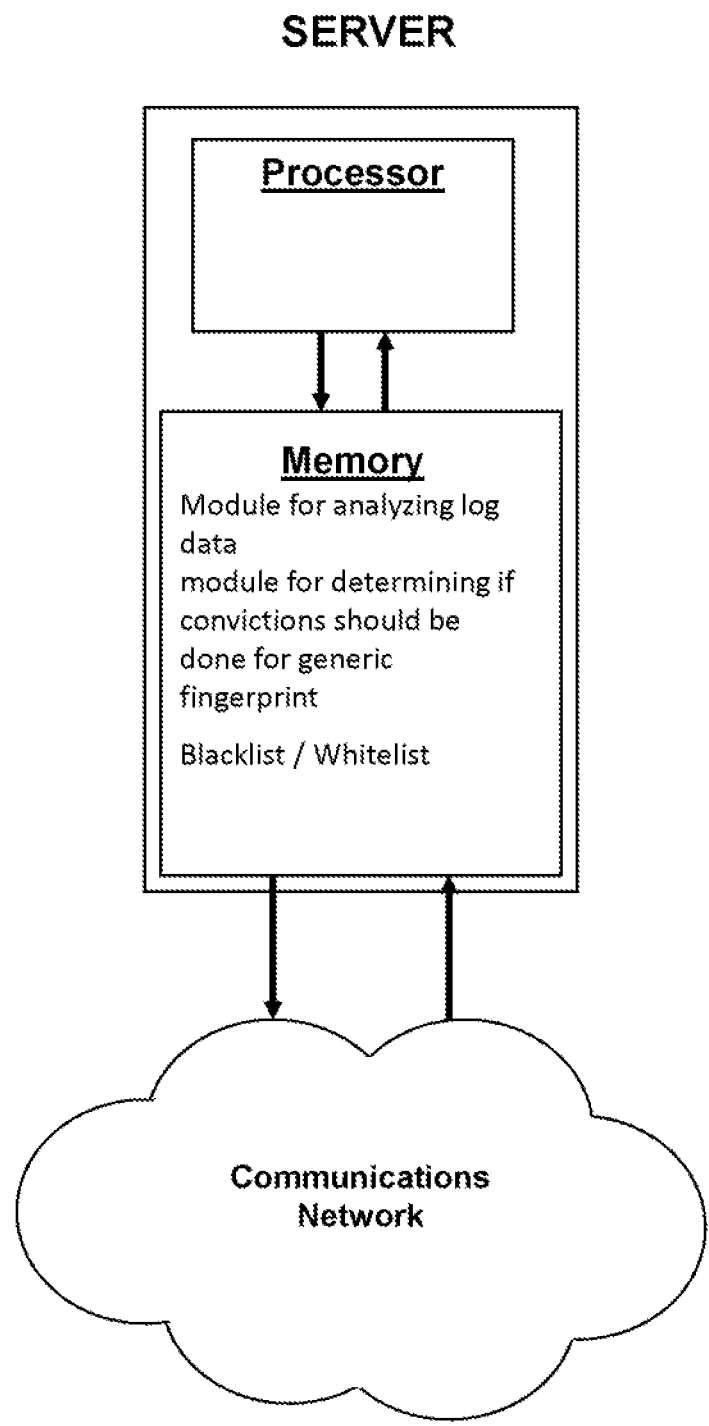
FIG. 5 is a server component including a module for analyzing log data for determining if convictions should be made for generic fingerprints in accordance with an embodiment of the present invention f.
Figure 6:
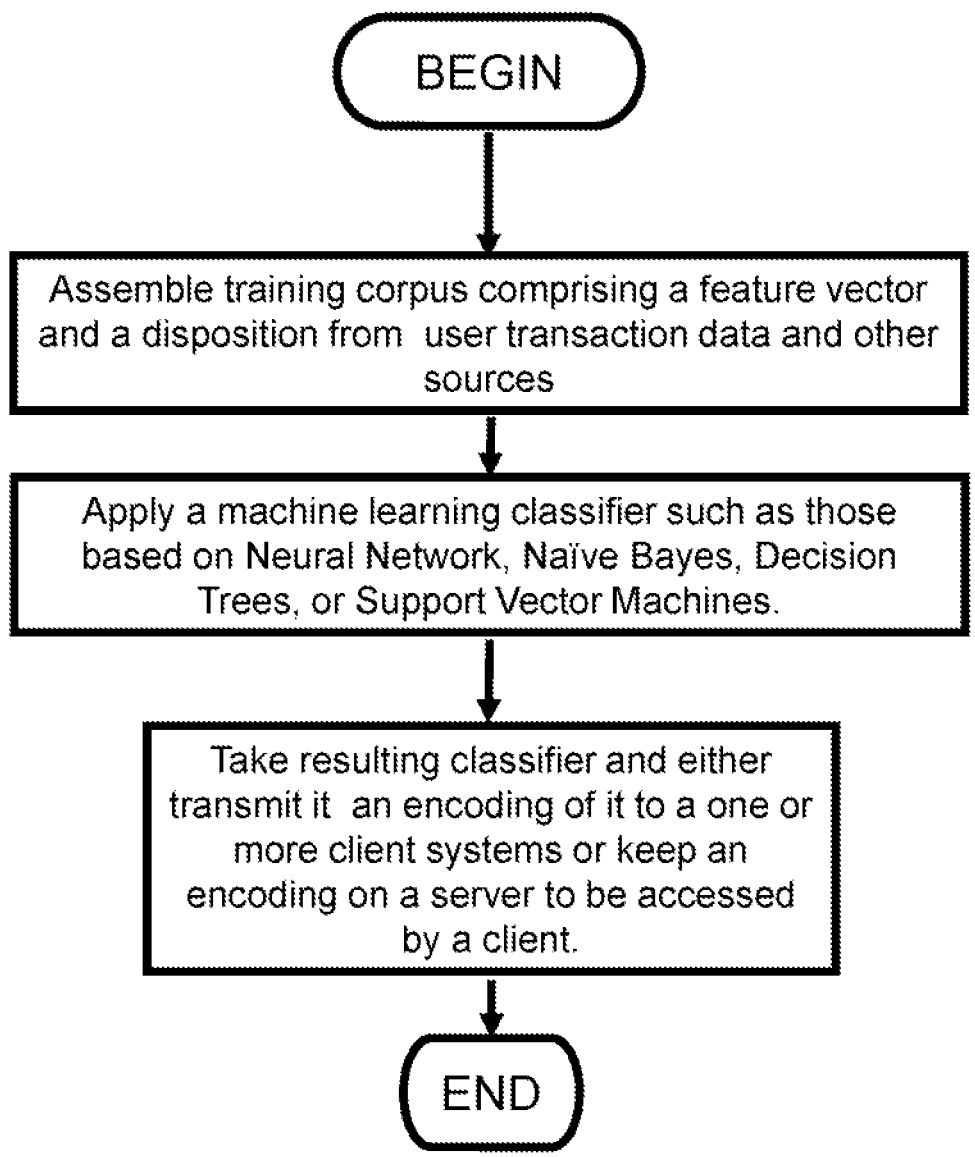
FIG. 6 represents a flowchart of the training procedure in accordance with a machine learning embodiment of the present invention.
Figure 7:
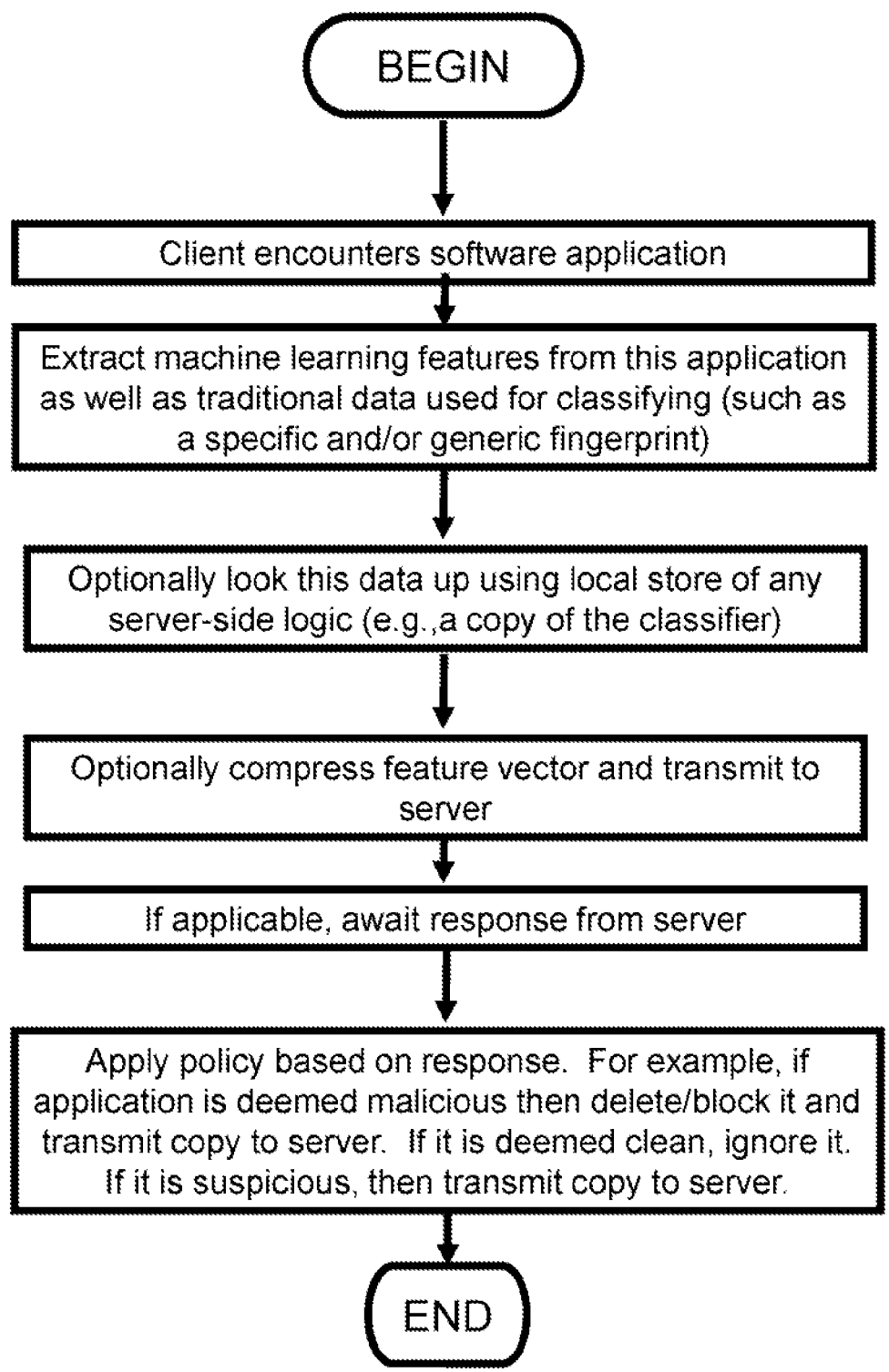
FIG. 7 represents a flowchart of a client-side feature extraction method in accordance with a machine learning embodiment of the present invention.
Figure 8:
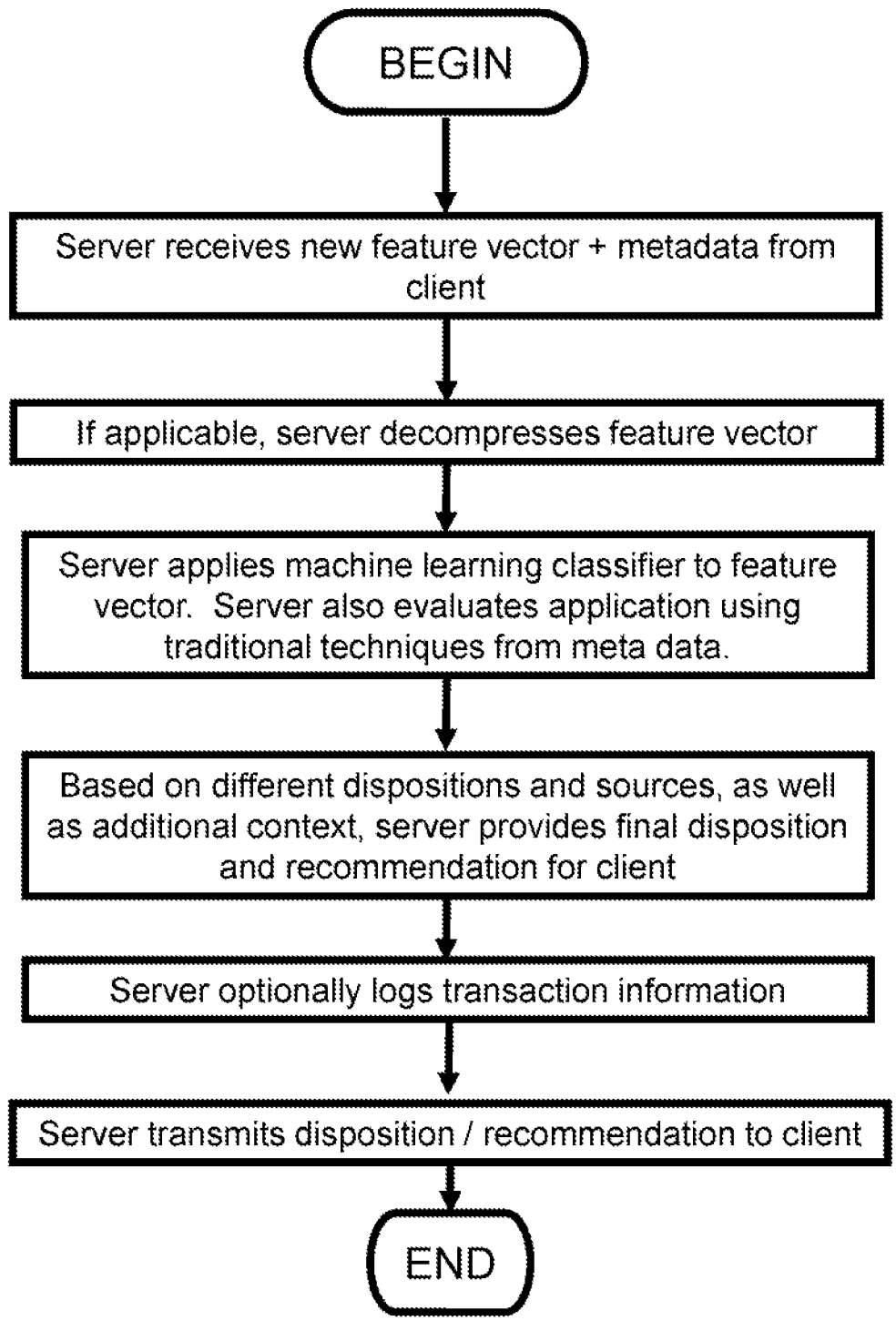
FIG. 8 represents a flowchart of the server-side evaluation method in accordance with a machine learning embodiment of the present invention.
Figure 9:
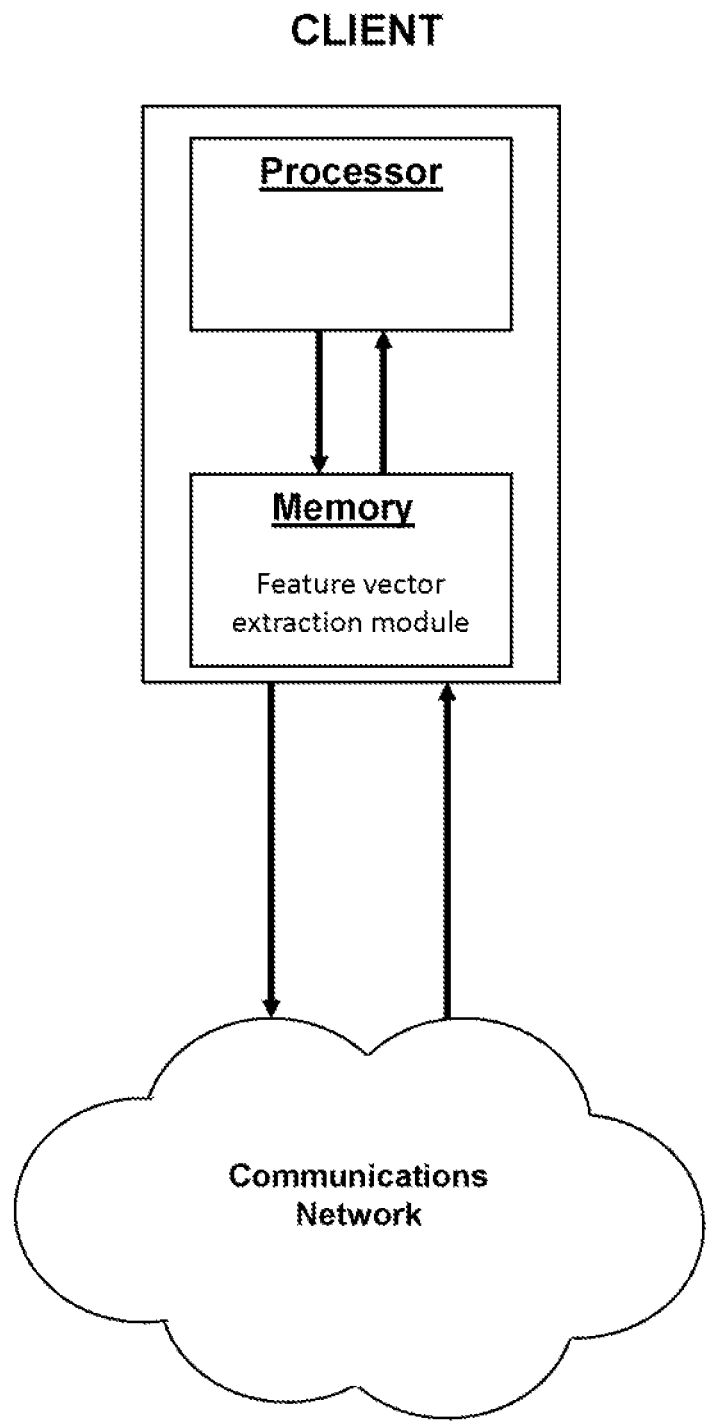
FIG. 9 is a representation of a client component including a feature vector extraction module in accordance with a machine learning embodiment of the invention.
Figure 10:
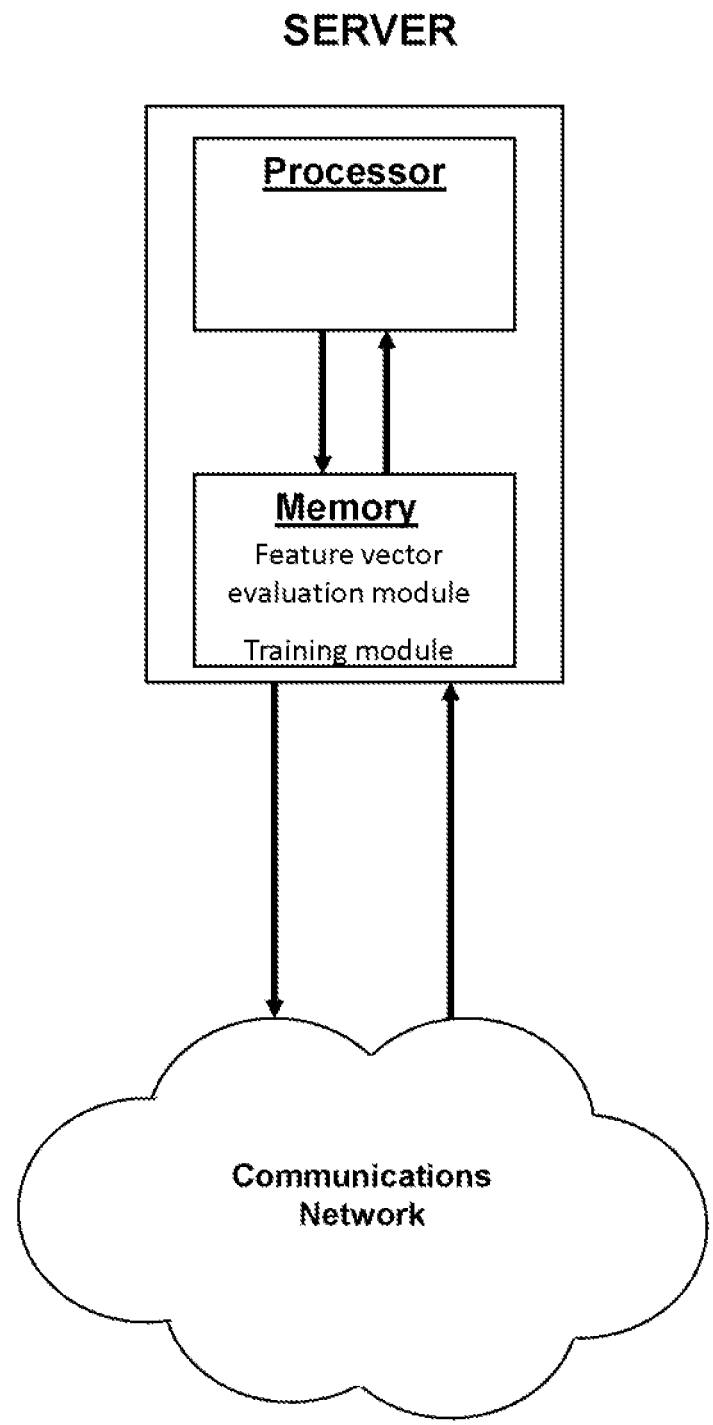
FIG. 10 is representation of a server component including a feature vector evaluation module and a training module in accordance with a machine learning embodiment of the present invention.
Figure 11:
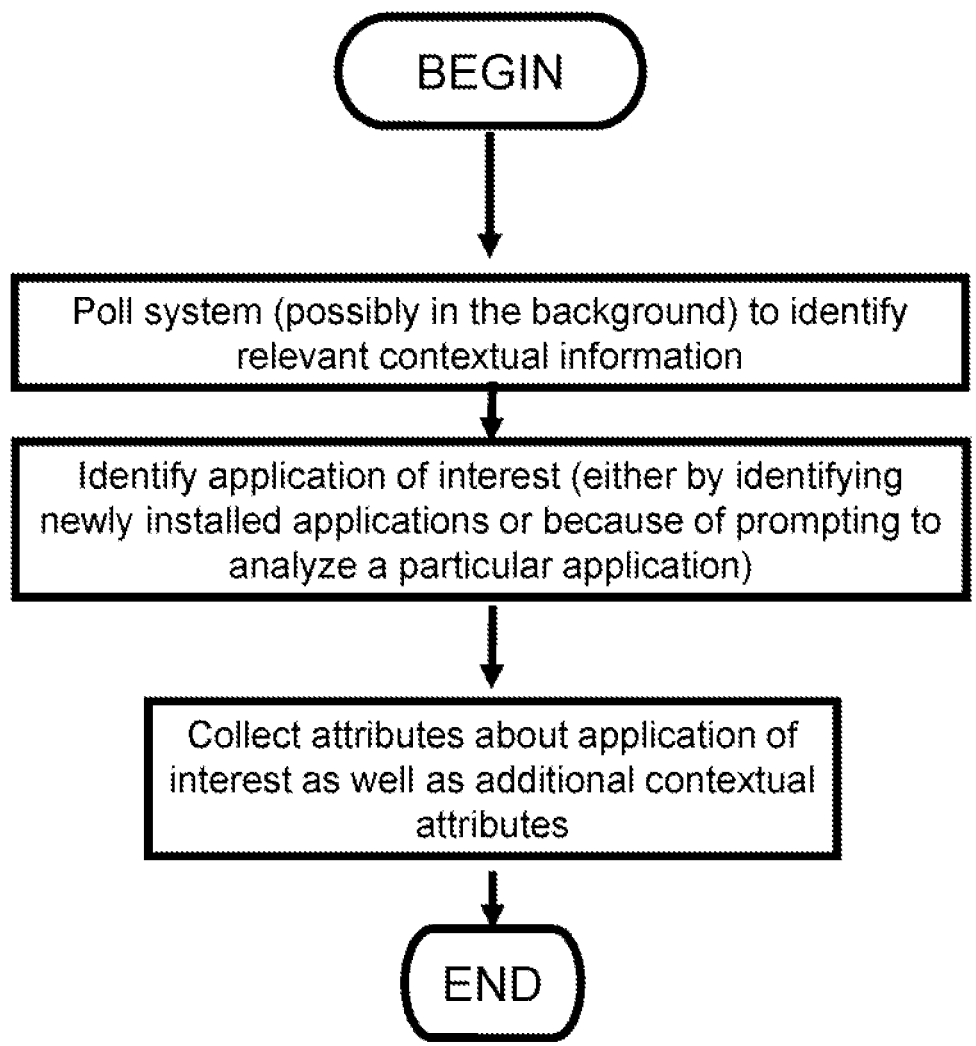
FIG. 11 is a flowchart representing steps in a method for collecting contextual attributes for the purposes of identifying if an application of interest is malicious according to an embodiment of the invention.
Figure 12:
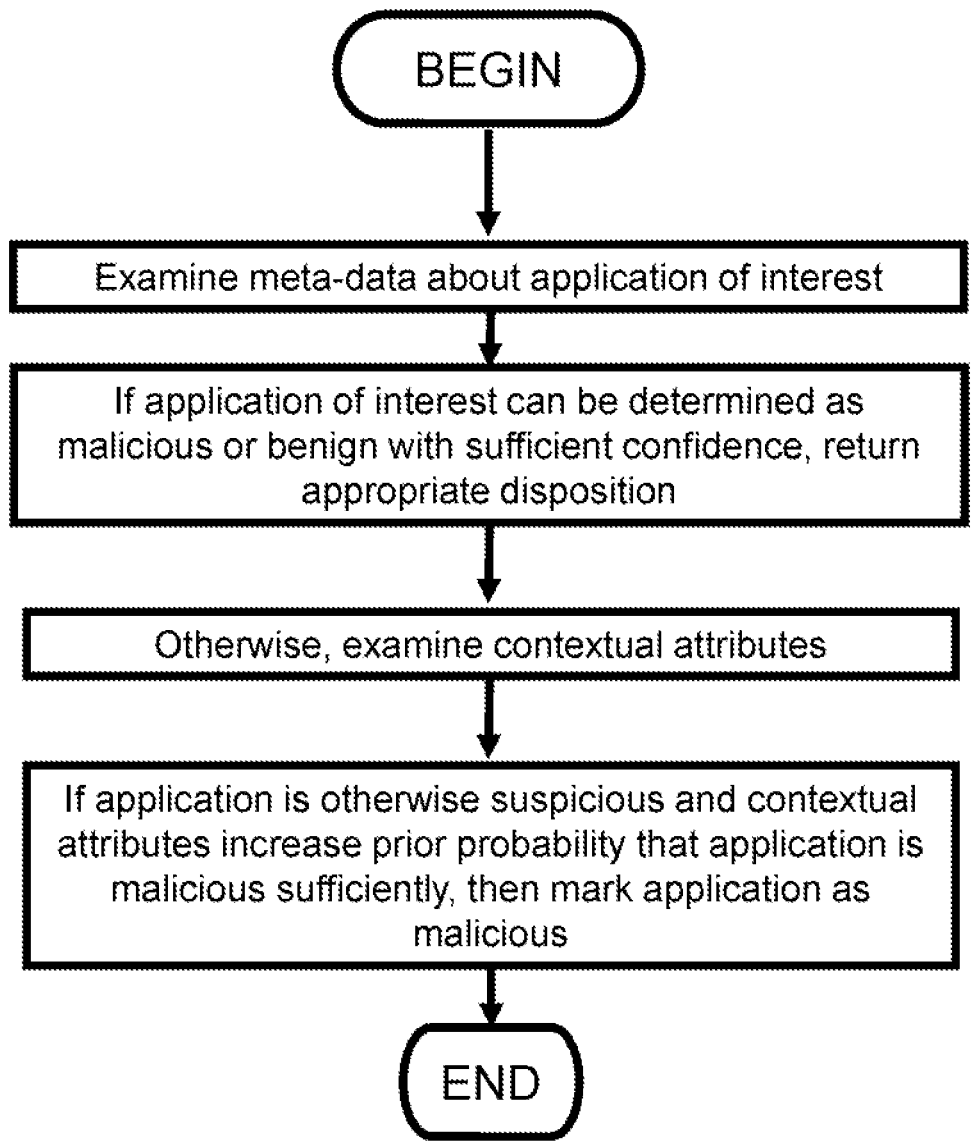
FIG. 12 is a flowchart representing steps in a method for using contextual attributes to identify malicious applications according to an embodiment of the invention.
Figure 13:
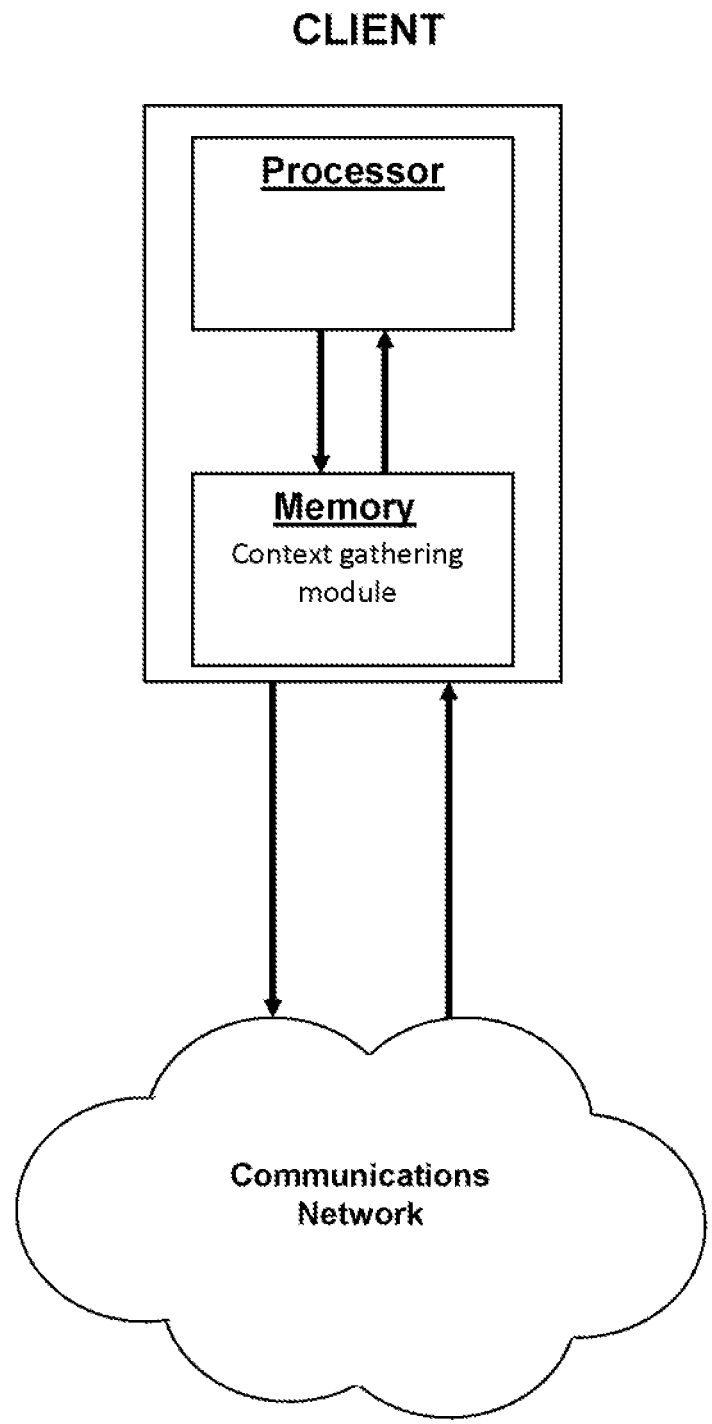
FIG. 13 is a representation of a client component including a context gathering module according to an embodiment of the invention.
Figure 14:
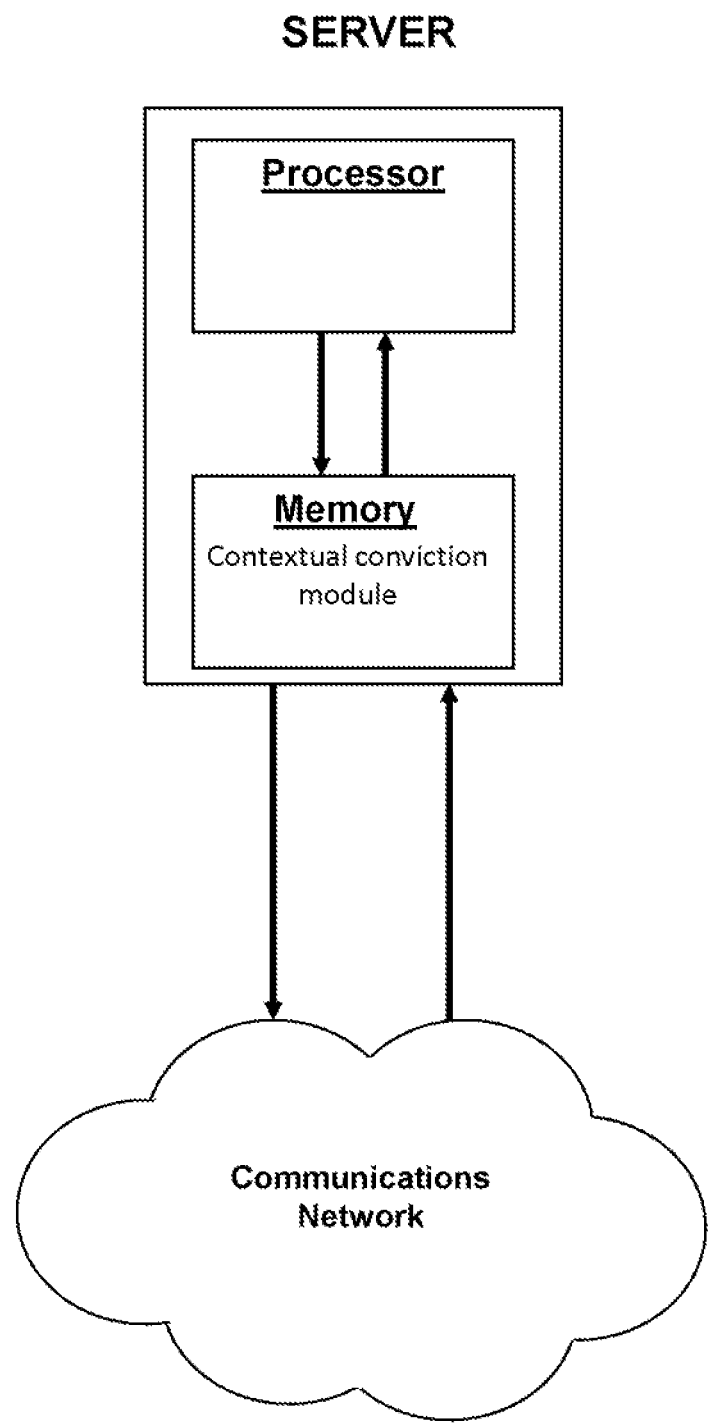
FIG. 14 is a representation of a server component including a contextual conviction module according to an embodiment of the invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The descriptions presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The description that follows will reference terminology that is generally known in the art. In the art, the term malware refers to a malicious software application. Such an application can have a number of nefarious purposes. For example, malware can be used to perform a number of malicious actions. These actions include, but are not limited to: stealing digital information from a victim's machine; using the victim's machine in the perpetration of other malicious activities (such as sending out unsolicited email messages or spam); remotely control the victim's machine; and inhibiting the machine from operating normally. In the art, a computer virus is generally considered one example of malicious software. In addition to computer viruses, other types of malware in the art include Trojans, Worms, Downloaders, and Misleading Applications.

It is understood that the maliciousness of an application can be subjective; it often depends on the user and typically includes a well-defined set of rules. For the purposes of this disclosure, a malicious application shall be understood to mean an application that is unwelcome to the user.

In the art, the term false positive references a situation in which an otherwise legitimate application is accidentally deemed malicious. Similarly, a true positive references a situation in which a malicious application is correctly identified as such. The false positive rate represents the likelihood that a legitimate application will be incorrectly called malicious by an anti-malware technique. The true positive rate represents the likelihood that a malicious application will be correctly called malicious by an anti-malware technique. It is therefore the objective of anti-malware software to achieve a high true positive rate while having a low false positive rate. In general, however, there is an inverse tradeoff between these two quantities. If an anti-malware technology is very aggressive and detects many threats, there is a greater chance it will have more false positives. Conversely, if an anti-malware technology is conservative and identifies fewer threats, it may lead to fewer false positives. In the art, the true positive rate is also referred to sometimes as the detection rate. It should be borne in mind, however, that the true positive and false positive rates are generally approximated using a data sample. Anti-malware vendors try to develop technology that will offer a favorable tradeoff between the false positives and the true positive rates. If a legitimate critical business application is incorrectly identified as malicious, then it could cause significant financial damage to the customer. Therefore, false positives are highly undesirable. In some instances, a false positive is so undesirable that one is willing to accept a lower true positive rate to ensure a very low false positive rate.

In the art, the term signature references a relatively short sequence of values that can be used to identify if an application is malicious or not. In its most general incarnation, the signature is computed as a transformation applied to an entire software application. In the art, a signature is typically computed on a known piece of malware. The signature is either transmitted onto a client's system or it is stored on a server. When a client encounters a new piece of software, it will compute a signature on that software, and determine if that signature matches one associated with a known piece of malicious software either by checking its local data store or by querying a server. It is understood in the art that a signature can either be specific or generic. If two software applications have the same specific signature, then with overwhelming likelihood, these two applications are entirely identical. One example of a specific signature in the art is a SHA-256 hash.

A generic signature differs from a specific signature in that it permits the possibility that variations on a given application will continue to have the same signature. If an application is taken, and superficial changes are made to it, then the generic signature on this application might continue to be the same as the original whereas a specific signature on it will with extremely high likelihood be different from that computed on the original. One example of a generic signature in the art is the PEhash. Another example of a generic signature in the art is ssdeep.

In the art, the term fingerprint is often associated with a traditional signature and the term fuzzy fingerprint is often associated with a generic signature. A fuzzy fingerprint is a transformation whose input is a software application and whose output is a (preferably shorter) sequence of symbols. Ideally, a fuzzy fingerprint will have two properties. First, if two applications are very close in nature (e.g., one application can be derived from the other with a small set of superficial changes), then the respective fuzzy fingerprints of these applications should be identical. Second, if two applications are considerably different, then the fuzzy fingerprints of these applications should ideally be different. These properties are ideal properties, and a fuzzy fingerprint still has value even if both properties fail to hold in a plurality of instances. A fuzzy fingerprint is an instance of a generic signature, though not all approaches to computing generic signature would yield a corresponding fuzzy fingerprint. In particular, a fuzzy fingerprint can be used to identify if an application is malicious by seeing if the fuzzy fingerprint of this application coincides with a plurality of fuzzy fingerprints associated with known malicious software applications. Since slightly different applications can have the same fuzzy fingerprint value, it can serve as a generic signature. One example of a fuzzy fingerprint in the art is the PEhash. Another example of a fuzzy fingerprint in the art is ssdeep.

In the art, the term conviction refers to a situation in which a piece of software is identified as malicious on a client system.

In the art, the term digital signature refers to a standard technology for computing a relatively short string from a file using techniques from the field of public-key cryptography. The transformation to compute the string from the file requires the use of a so-called private signing key. A public verification key can be used to determine if a purported signature on a file has been correctly computed. A secure signature scheme is such that without knowledge of the private signing key, it is computationally infeasible for one to compute a signature that will be construed as valid. A digital signature should not be confused with the types of signatures mentioned above for detecting malicious applications (even though in the art these notions all use the term "signature").

The following description will also reference terminology from the field of machine learning, and is known to those skilled in the art. In its simplest form, machine learning techniques can be used to classify objects into one of a plurality of sets. Within the context of anti-malware solutions, machine learning techniques would be used to identify whether a given software application is likely to be malicious or benign, and potentially produce a score that reflects the confidence in that classification. To avoid obscuring the details of the invention, in the following, the nomenclature associated with machine learning techniques will be described in reference to their application towards the classification of software applications as being either malicious or benign. Machine learning approaches first tend to involve what is known in the art as a "training phase". In the context of classifying software applications as benign or malicious, a training "corpus" is first constructed. This corpus typically comprises a set of software applications. Each application in this set is optionally accompanied with a "label" of its disposition, for example "benign", "malign", or "unknown". The labels can be determined either through manual analysis or through some other independent and possibly more expensive means. It is desirable to have fewer unknown samples, though at the same time is understood in the art that labeled data may be more expensive to obtain.

Furthermore, it is desirable for the corpus to be representative of the real world scenarios in which the machine learning techniques will ultimately be applied. For example, in the context of classifying software applications, it might be desirable if the applications in the corpus are reflective of what might be found on a typical end-user computer system and specifically be reflective of the files on that system that will be classified using machine learning techniques. In the first phase of the training process, a feature vector is extracted from each software application. A feature vector is a series of values that represent the salient features of a software application in the corpus. The expectation is that these values are especially relevant for identifying whether the application is more likely to be malicious versus benign.

For example, one feature value might be a single binary digit (0 or 1) representing whether the file is digitally signed. This feature might be relevant since in practice illegitimate applications are infrequently digitally signed. Another relevant feature might be the size of the file containing the software application. This feature might be relevant since malicious applications tend to have a smaller size than benign ones. It is important to note that any single feature might not yield any conclusive evidence over whether an application is malicious or benign, but examining a plurality of such feature values could provide conclusive evidence. It is also important to note that in many instances the kind of features to use in a machine learning system is often determined through specific domain expertise rather than being derived through entirely automated means. For example, it might require domain expertise to determine that knowing whether a file is digitally signed is valuable information.

Once feature vectors are extracted from the training corpus, then these vectors, together with the labels associated with any of the files themselves, are fed into an algorithm that implements the "training phase." The goal of this phase is to automatically derive a "model". A model effectively encodes a mathematical function whose input is a feature vector and whose output is a classification. In the context of using machine learning to detect malware, the output of the model might be a binary label of either "benign" or "malign". Certain machine learning models are also capable of producing a score that reflects the confidence in the label. For example, the output might be an encoding of the form ("malign", 0.95) which can be taken to mean that the model believes that the feature vector has a 95% chance of corresponding to a malicious software application. A machine learning algorithm should ideally produce a classifier that is reasonably consistent with the labels provided in the training examples and that has a reasonable likelihood of generalizing to new instances. Generalization is important since it is expected that in practice the model will be evaluated on instances whose dispositions are not already known.

Specific machine learning algorithms in the art include the Naive Bayes Algorithm, Artificial Neural Networks, Decision Trees, Support Vector Machines, Logistic Regression, Nearest Neighbors, etc. The term classifier is also used to describe a model. For example, one may refer to a Support Vector Machine classifier. Once the classifier/model is established, it can be used to evaluate new instances of software applications that are presented to the computer or computer network in practice.

In the context of detecting malware, a client system would first extract the feature vector associated with a software application and then apply the model to that feature vector to obtain a disposition and optionally a confidence value. Finally, it would apply a policy based on this information. The actual classification process need not happen locally on the client. Instead, it could be performed on a remote server, in which case it is expected that the client will transmit an encoding of the feature vector to the server. The server would, in turn, apply evaluate the feature vector using the classifier and make a corresponding determination about whether the application of interest is good or bad. The policy associated with the final classification could be complex if the classification also includes a confidence value. For example, if a system is highly critical or holds very sensitive information, then an application might be blocked unless there is a high likelihood of it being benign. On the other hand, if the system is not as sensitive then, the converse stance can be taken. Specifically, only applications that have a high likelihood of being malicious would be blocked.

The following description will also make use of the concept of a log, which is known in the art. A log is a record of transactions and actions made on a given system. For example, if a system were a web server, then a log would comprise a description of the plurality of clients who connected to the system, the times they connected, and what actions they took. With a log, one can construct a reasonable synopsis of what happened on a given system. In the context of an Anti-Virus system, including one that uses a server component for assisting a client that desires a disposition for a given software application, a log entry could include, but not necessarily be limited to, the following: a client identifier that can be used to link disparate transactions from the same client, a timestamp specifying the time a client made a particular request for the disposition of a particular application, the location of the client (as specified by its Internet Protocol or IP address), a description of the file whose disposition is being requested (e.g., as encoded by a file fingerprint such an MD5 or a SHA-256), any Anti-Virus fingerprints associated with the application (including, but not limited to traditional fingerprints and generic fingerprints), attributes of the software application in question (including, but not limited to a machine learning feature vector of the attributes of the application of interest), contextual data about the application of interest that may aid in determining its disposition, the response of the server component (including, but not limited to the final assigned disposition of the application, a sub-disposition that provides additional description about the application such as that the application was previous unseen or is common in the field, the recommendation the server makes to the client about that application, and the dispositions assigned by different sub-technologies that were used in the process of coming up with a final disposition, and a caching time or time-to-live for the response that indicates how long the response might be valid for).

Since queries to a server can be complex and multi-faceted, the log entry can also include an entry that specifies a query type. For example, in one query to a server, a client might only include a basic fingerprint. In a subsequent query for the same file the client might include additional information. These two queries can be recorded separately with different query types (though when analyzing the logs, it might help to link the fact that the same client made two queries about the same file). A log would them comprise a plurality of log entries transmitted by a plurality of clients. In the context of the disclosed invention, the machine learning techniques that will be deployed can be trained directly off of log data.

For the purposes of the disclosed invention, it will be helpful to distinguish between two sets of applications running on a client system. The term "applications of interest" are used to refer software applications that reside on a client system or are about to reside on a client system, and where the user or an Anti-Malware component on the client system is interested in the disposition of these applications. Aside from applications of interest, this disclosure references other types of software applications, for example, a software application that might be running while the application of interest is running. Such a software application might include, but not be limited to, a web browser, a Peer-to-Peer file sharing client, a Banking Application, or a PDF reader. If a Peer-to-Peer file sharing application is running while an application of interest is running, that might point to a slightly increased likelihood that the application of interest is malicious, since malicious applications are often transmitted via Peer-to-Peer networks. Along similar lines, if a banking application is running, then regardless of whether the application of interest is malicious, it might make sense to block it or otherwise suspend its operations since even if there is a small risk that the application of interest is malicious, the risk would not be worth the cost of having financial data compromised or stolen. It should be borne in mind that these considerations are simply signals associated with the likelihood that the application of interest is malicious. Taken individually, these signals are likely not enough to warrant taking action against the application. However, a plurality of such signals together with information about the application of interest can provide more conclusive evidence as to whether or not the application has malicious intent. By viewing these signals as attributes in a feature vector, machine learning methods can also be applied to these signals.

Generic Signatures Embodiment

In one embodiment of the present invention, the client and server components would function as follows. The server would engage in an optional initialization phase wherein it would compute a fuzzy fingerprint on both known malicious and known clean files. These results would be stored in a data store such as a traditional database or even in a flat file. The algorithm for computing the fuzzy fingerprint could be any one known in the art, examples of which include PEHash and ssdeep. Alternatively, a manual or custom algorithm can also be employed. The choice of fingerprinting implementation does not impact the reduction to practice of the invention so long as the choice is consistent (i.e., the client and server use the same algorithm).

If the server has determined that there is sufficient evidence that the fuzzy fingerprint is conclusively bad (for example, if there are a large number of known malicious applications that have this same fingerprint and no known good applications that have this same fingerprint), then the fuzzy fingerprint can be marked conclusively bad. To assist in this determination, the server can maintain a data structure comprising fuzzy fingerprints associated with applications that are either known to be good or strongly believed to be good based on their attributes. Any software application whose fuzzy fingerprint is found in this data structure would preferably not be marked as conclusively bad. This disposition can be transmitted directly to a client (and stored locally on it) or can be stored on the server itself (to be made available should a client query for it), or some combination thereof.

If the server has noticed that there is some evidence, but not yet conclusive evidence, that the fuzzy fingerprint might be bad (for example, there are no known good files with this same fuzzy fingerprint but there are one or more bad files, including the one just processed, with this fuzzy fingerprint), it can note that the fingerprint is possibly bad. If the server has noticed that there is some evidence, but not yet conclusive evidence, that the fuzzy fingerprint might be good (for example, there some known good files with this same fuzzy fingerprint), it can note that the fingerprint is possibly good. Similarly, if the server has noticed that there are both good and bad applications associated with a particular fuzzy fingerprint, then it can classify the fingerprint as conflicted.

When a client encounters a new file, it could first optionally use standard techniques in the art to determine if the application poses a threat. The steps to do so would optionally include computing a traditional fingerprint (e.g., a SHA-2, an MD5, or other technique known in the art) of the application and optionally gathering other metadata that can be used to determine (possibly with the help of a remote server) whether a file is malicious.

The client would also compute a fuzzy fingerprint of the application. It can optionally look up the fuzzy fingerprint in its local data store to determine if it is known to be malicious, and if so, take an appropriate action. Otherwise, it can query a remote server and provide it with the fuzzy fingerprint value, and any other data collected about the application, such as the traditional fingerprint and other file metadata.

The server, in turn, can record the information it receives. If the fingerprint has been deemed conclusively bad (using the information that the server already stored possibly with the information it just received about the application), then the server can inform the client of this distinction. The client can then take an appropriate action (in one embodiment of the present invention, this action could involve outright deleting the application or otherwise blocking a user from installing it). If the fingerprint has been deemed possibly bad, then the server can inform the client of this distinction. The client can then take an appropriate action (in one embodiment of the present invention, this action could involve providing the server with an actual copy of the software application for further analysis).

In one embodiment of the present invention, the server can put a number of safeguards in place to reduce the risk that a given application is called malicious. These safeguards can include, but are not limited to the following. First, if the application is known to be good through a more direct means (such as the traditional fingerprint, like a SHA-256, matching one on a known whitelist of good software applications), then the server can override the fuzzy fingerprint distinction. Second, the use of the fuzzy fingerprint can be throttled. For example, the server can limit the number of convictions associated with this fingerprint to a modest number like 5. Along similar lines, convictions based on fuzzy fingerprints can be limited to situations where the popularity of the application of interest is below a certain threshold. In this scenario, a parameter N can be introduced into the system and an application would only be convicted if fewer than N systems appear to have this application. This restriction would ensure that if there is a mistake, its damage would at least be contained. It is also known in the art that malicious files tend to be less popular than benign ones. Therefore if a file is popular, one would have to be more careful if convicting it. Third, convictions with a fuzzy fingerprint could be restricted to certain classes of files that have a slightly higher likelihood of being malicious. For example, it is known in the art that files with a smaller size have a higher likelihood of being malicious compared to larger files. This is the case since malicious parties have a higher chance of success of transmitting a smaller file onto a victim's machine. It is also known in the art that digitally signed files have a smaller likelihood of being malicious compared to digitally unsigned files. Similar considerations can apply for other file attributes as well. Therefore, in one embodiment of the present invention, fuzzy fingerprint based convictions can be optionally restricted specifically to software applications whose size is below a certain threshold and that are not digitally signed. Fourth, convictions with a fuzzy fingerprint can be reserved for specific situations. In one embodiment of the present invention, if a machine has a propensity for getting infected with a specific threat (for example, it has encountered this type of threat previously or it is in a geographic region associated with a particular threat), then we can apply a fuzzy fingerprint to such cases.

In one embodiment of the present invention, the server can make an independent determination about whether a particular fuzzy fingerprint corresponds to a malicious or clean file. In this case, the server can rely on third-party knowledge, such as the presence of a plurality of software applications from collections of known malware that have a certain fuzzy fingerprint. Alternatively, the server can look for the presence of a plurality of software applications from collections of known clean files that have a certain fuzzy fingerprint. Finally, the server can examine user log data to determine the likelihood that applications are malicious or clean. In particular, if an application with a particular fuzzy fingerprint is very popular, but not otherwise known to be malicious, then it is generally very likely that the application is in fact benign. In this case, it would be risky to call applications with this same fuzzy hash value malicious.

Example 1

Example 1 is provided to illustrate one aspect of the invention. This example illustrates one possible work flow according to the invention and is intended to help make the invention more clear. It is not meant to restrict the invention in any way since there are numerous variations not described in Example 1 that nevertheless fall within the scope of the overall invention, but which are left out of the Example 1 to avoid obscuring it.

According to Example 1, a client and a server are provided. A new software application arrives on the client. The client computes both a generic and specific fingerprint on this file and transmits it to the server. The server examines both of these fingerprints. If from these two pieces of information alone, it knows the application to be either conclusively good or bad (e.g., the file is on a known blacklist or whitelist), then the server will return this disposition.

If no conclusive determination can be made from either of these two pieces of information, then the server will look up every specific fingerprint it has seen in the past associated with the generic fingerprint sent up in the query. (Note that because multiple distinct files can have the same generic fingerprint, it is possible that we will have multiple specific fingerprints that can be associated with the same generic fingerprint.) For simplicity, imagine that we have the following fingerprints in our queries: (G, S0), (G, S2), (G, S3), ..., (G, S9), where S1, ..., S9 are distinct specific fingerprints all of which correspond to the same generic fingerprint G. Now, suppose a threshold of these specific fingerprints are malicious (e.g., imagine that S0, ..., S7 all correspond to known malware). Further, suppose that none of these specific fingerprints seen in the past is associated with a known benign file (i.e., a file on a whitelist). In other words, S8 and S9 have previously unknown disposition (i.e., they could be malicious or benign—but no one has made a determination yet). In that case, a pattern emerges. The vast majority of the specific fingerprints associated with the generic fingerprint G appear to be malicious. In this case, it seems reasonable to draw the conclusion that the generic fingerprint itself should be marked as malicious.

The server, following this line of steps, will mark the generic fingerprint "G" as malicious and return the corresponding answer to the client.

Note that while we described the decision making process as happening in real time (i.e., on the fly), in practice, it can happen separately. In other words, a software module on the server can periodically go through logs of previous queries, and attempt to pick out generic fingerprints that appear to be malicious because the overwhelming majority of the specific fingerprints associated with them appear to be malicious. These generic fingerprints can then, as such, be marked malicious.

In this manner, when the server is asked to make a decision, it can simply perform a look-up rather than trying to perform the computation on the fly. At the same time, this approach will not leverage any relevant information gathered since the last time the logs were analyzed.

Machine Learning Embodiment

In one embodiment of the present invention, the client and server components would function as follows. During the initialization phase, the server would train a classifier. In one embodiment, the training data can be taken directly from actual existing user logs where a fingerprint for a file was submitted earlier and was classified possibly through independent means. For example, the file might have been known to be benign or malicious because of its presence on an existing whitelist or blacklist.

The log data can be optionally stratified or partitioned based on different criteria such as whether the users have natural groupings and sub-groupings that can include, but not be limited to, geographic groupings (i.e., the users are from similar locales) and affiliate groupings (that is, the users might be affiliated with each other—for example, they may all be members of the same enterprise or may have acquired the system or software of the invention through a common source—such as a common download server or common distribution channel). If the training data is stratified or partitioned according to some criteria, then the training data used can be derived from a plurality of partitions or strata from the logs. A benefit of partitioning the training data is that machine learning classifiers can be fine-tuned to a specific portion of the input space and as a result can have improved performance on instances of this portion of the space. The training phase would have multiple parameters. Once a classifier is developed, it may be deployed in the field.

In one embodiment, one could automatically generate actual computer instructions (or some appropriate encoding of computer instructions that can be subsequently interpreted) that implements the mathematical function specified by the classifier. In one embodiment, these instructions can be stored on a remote server. In an alternative embodiment, these instructions can be transmitted to a plurality of client systems.

In another embodiment of the present invention, when a client system encounters a new software application, it would extract a feature vector associated with this application together with any other data that might independently determine if the application is benign or malign. The feature vector need not be limited to attributes of the specific application, but could also include other attributes of the system on which the application is running. The attributes in the feature vector associated specifically with the binary contents of the application could include, but not be limited to, the following: properties of the binary contents of the application; list of Dynamic Linked Libraries (DLLs) referenced by the application; values of specific positions within the binary contents; the number of sections, number of symbols, and positions of the different sections of the binary; size of the binary.

In some embodiments, the feature vector will include an encoding of which Dynamic Linked Libraries are referenced by the application. In other embodiments, the feature vector will include the number of sections, number of symbols, and positions of the different sections of the binary. In other embodiments, the feature vector will include the size of the binary. Attributes of the feature vector associated with the application in general could include, but not be limited to: information about the registry keys used in the application as well as any modifications made to the registry (typically for threats that execute on Windows); the filename of the application; behavioral attributes of the application, such as network ports used and Application Programmer Interface calls made; files modified and created by the application; and services stopped or started by the application.

In some embodiments, the feature vector will include the filename of the application and registry keys used. Attributes of the feature vector associated with general context of the application could include, but not be limited to: the processes running on the system at the time the application is encountered; the source of the application (e.g., CD ROM, USB Stick, Web Site); the infection history of the machine; the geographic location of the machine; and the IP address of the machine. In some embodiments, the feature vector would include the source of the application and the processes running on the system at the time the application is encountered. In other embodiments, the feature vector would include the IP address of the machine. In general, the feature vector would include information about a plurality of these features.

It should be borne in mind that in constructing the feature vector, the foregoing feature values need not be transmitted verbatim, but would be encoded in a way that facilitates the application of machine learning techniques. For example, rather than listing every Dynamic Linked Library associated with an application, instead a binary value can be used to denote whether a specific Dynamic Linked Library was used, such as winsock.dll. In one embodiment, in addition to the feature vector, the client can compute a traditional fingerprint such as a SHA-256 or a generic fingerprint such as one obtained through PEHash or SSdeep (both of which are known in the art), or a combination of both. While the feature vector is primarily relevant in classifying the file using the machine learning techniques that have been outlined in the foregoing, the other data might be of use for future training. For example, a file whose disposition was unclear at the time it is first encountered might be subsequently found on a blacklist of known malicious applications. If that list is indexed by SHA-256, then having both the client compute both the SHA-256 value as well as the feature vector would subsequently allow the feature vector to be associated with a specific disposition. This feature vector can then be added to the training corpus for future training phases.

In one embodiment of the present invention, the client can take the feature vector value and compress it. While there are general-purpose techniques in the art for compressing data, for this particular instance, special-purpose techniques that yield desirable performance parameters, particularly with respect the amount of data communicated between the clients and the server could also be used.

Upon optionally compressing this feature vector, in one embodiment of the present invention, the resulting data would be transmitted to a remote server. The client may alternatively store the logic associated with the server so that a remote look-up is avoided.

In one embodiment of the present invention, the server would decompress, if necessary, the data transmitted by the client, which includes the feature vector provided by it, and then evaluate the feature vector against the model it has in place. If the client provided other data such as a traditional fingerprint or a generic fingerprint, then the server can optionally override the results from the classifier with a disposition arrived through more traditional means. For example, if the client transmitted the SHA-256 value of the application is it concerned with, and this value happens to be on a known whitelist of good applications, then the server can respond that the application in question is good regardless of what the machine learning model says. The premise behind this approach is that the machine learning model may be more fallible than a direct whitelist or blacklist (though one should keep in mind that whitelists and blacklists have limitations as well—e.g., they may only have a modest number of entries, whereas a machine learning model can be applied to any file, even one that was not previously known). The server would then provide a response to the client regarding what its ultimate verdict was together, if necessary, with information on what actions it would like the client to perform. The transaction record associated with this transaction, comprising a client identifier, a timestamp, the feature vector values, the other fingerprint values, and the ultimate disposition and information on how that disposition was derived, information on what type of action the server would like the client to perform, among other things, is optionally recorded. This transaction record can be used subsequently in the training phase of a new classifier since it has three desirable characteristics of a training corpus. First, it contains a feature vector that can be provided as input into a machine learning training algorithm. Second, it contains a disposition, which many training algorithms require. It should be borne in mind, however, that for training purposes it would be desirable to use dispositions attained through independent means like generic or specific fingerprints rather than previous machine learning based dispositions, otherwise there is a risk of introducing a circular feedback loop. Third, the training example generated from this data is coming from an actual user instance in the field and hence is likely to be a good representation of what a typical user will encounter in the future.

In one embodiment of the present invention, the client would receive a verdict from the server as well as possible actions associated with that verdict, and act in accordance with that response according to a specified policy. In one embodiment, the possible response could comprise, but not be limited to, the following: convicting the application (i.e., removing it from the system or blocking a user from installing it) and optionally transmitting a copy to the server; or allowing the application to stay on the system; and/or requesting the application to be transmitted from the client to the server for additional analysis.

The last option would, for example, be relevant if the server thinks that the application is potentially malicious, but its confidence is not high enough and has an uncomfortably high risk of causing a false positive (in this case, by transmitting the file to the server, additional more extensive analysis can be performed on it—such analysis might be too expensive to perform for each file encountered, but might be suitable when applied just to the subset of files that are suspicious).

In one embodiment of the present invention, the server can put a number of safeguards in place to reduce the risk that a given benign application is incorrectly called malicious. These safeguards can include, but are not limited to the following. First, as mentioned in the foregoing, if the application is known to be good through a more direct means (such as the traditional fingerprint, like a SHA-256, matching one on a known whitelist of good software applications), then the server can override the disposition provided from the machine learning classifier. Second, the use of the machine learning classifier can be throttled. For example, the server can limit the number of convictions associated with this classifier to a modest number. Even further, the number of classifications associated with a given application can be throttled. For example, for every SHA-256, it can be convicted no more than N times (for a modest choice of N like 3) using machine learning classifiers. This measure would ensure that if there is a mistake, its damage would be contained (and since most malicious software tends to have low frequency because of its fly-by-night danger, this type of throttling can yield a favorable tradeoff between the detection rate and false positive rate). Third, convictions with a machine learning classifier could be restricted to certain classes of files that have a slightly higher likelihood of being malicious. For example, it is known in the art that files with a smaller size have a higher likelihood of being malicious compared to larger files. This is the case since malicious parties have a higher chance of success of transmitting a smaller file onto a victim's machine. It is also known in the art that digitally signed files have a smaller likelihood of being malicious compared to digitally unsigned files. Similar considerations can apply for other file attributes as well. Therefore, in one embodiment of the present invention, machine learning classifier based convictions can be optionally restricted specifically to software applications whose size is below a certain threshold and that are not digitally signed. Fourth, convictions with a machine learning classifier can be reserved for specific situations.

In one embodiment of the present invention, if a machine has a propensity for getting infected with a specific threat (for example, it has encountered this type of threat previously or it is in a geographic region associated with a particular threat), then we can apply a machine learning classifier to such cases. Fifth, classifiers can be made to model specific threat instances. For example, one popular malicious software threat in the art is known as Conficker. There are many variations of Conficker, but there is sufficient commonality among these variations to view them as part of the same overall family. In one embodiment of the present invention, therefore, a classifier can be trained specifically to target a specific threat. To do so, the clean files and feature vectors in the corpus can remain the same, but only malicious files and feature vectors associated with a specific threat can be included. A benefit of this approach is that a classifier which is fine-tuned to a specific threat might yield a low false positive rate for that threat and also some end-users might desire to know which particular threat targeted their system. Sixth, the application of the classifiers can be restricted to files whose popularity is below a specified threshold. In one embodiment, a parameter N can be introduced into the system and an application would only be convicted if fewer than N systems appear to have this application. Seventh, the application of some classifiers can be restricted to situations in which the system in question has a slightly higher chance of being infected with a threat. Indicators that suggest an increase in likelihood of being infected include, but are not limited to, an observation of recent infections on the system, knowledge that the system was recently targeted for attack, the presence of vulnerable software applications on the system, the presence of applications on the system that are common vectors for infections (such as Peer-to-Peer file sharing clients), and the presence of open network ports on the system.

It should be borne in mind, however, that practices that attempt to reduce the false positive rate also generally reduce the detection rate since some actual malware might be inadvertently be called good as a result of this safety net. In the art, it is acknowledged that such a tradeoff exists and depending on the specific application, it would be determined whether this tradeoff happens to be desirable. For example, if the risk of a false positive is reduced dramatically whereas the detection rate is only reduced slightly, then the tradeoff may be favorable. Alternatively, if the cost of a false positive is very high, which is very possible given that blocking a legitimate application could translate into monetary business losses, then it may be desirable to take a more conservative stance that reduces it substantially even if that creates a corresponding substantial drop in detection rate. On the other hand, if the cost of a missed detection (or false negative) is very high, such as what might happen for a system that needs to be highly secured, then a high false positive rate might be tolerable so long as the risk of a threat infiltrating the system is made very small.

Example 2

This example illustrates a specific instance of the invention, describing the steps and actions along the way. This example is provided to help clarify the description, and it should not be considered limiting in any way. For example, the above invention description covers many variations and extensions. To avoid obscuring the description, these variations and extensions are not discussed below.

To begin, consider a piece of agent software running on a user's machine. According to this example, the agent software contains a Microsoft Windows filesystem mini-filter driver that can detect when a new (executable) file is being written to the file system. Other software that can detect when a new executable file is being written to the file system can also be used. Following notification that there has been or is an attempt to write a file to the file system, the software agent computes two values. First, it computes a "traditional" fingerprint, such as a SHA-256, on the file. Second, it computes a machine learning feature vector from the file. The feature vector will comprise a number of attributes associated with the file on this system, including, but not limited to: which DLLs are referenced by the application, the values of specific positions of the binary contents, the number of sections in the file (and any attributes associated with those sections—such as whether it is readable, writeable, or executable), the number of symbols, the size of the binary, whether the binary is digitally signed, etc. All of these attributes are easily computed from the binary contents of the file. In addition, other contextual pieces of information are included in the feature vector, including, but not limited to, the file system timestamp, properties of the filename (note that the same file may have different names on different systems, so this attribute is specific to an instance of the file on a given system), information about other software applications installed on the system (e.g., whether the system has any vulnerable software or software that commonly leads to a system infection, etc.), and recent infection history of the system (e.g., such as whether the user experienced any infections in the last half an hour). These attributes are encoded appropriately, and compressed as well (for compact transmission).

The client then sends the fingerprint and the feature vector to a server. In addition to these two values, the client may optionally include an identifier (to help link other transactions from the same client).

The server, in turn, first looks up the file in any blacklists and whitelists (using, for example, the traditional fingerprint to perform this look-up). If this look-up results in a conclusive disposition (e.g., the file is conclusively known to be malicious or benign), then this disposition is communicated to the client. The server at this stage can optionally look-up additional information about the file (e.g., how many users it has, etc.), and then store the fingerprint, the basic feature vector, the additional information, the timestamp of the query, the user's identifier, and the disposition per the blacklists/whitelists. The storage format may be a server transaction log.

If the server does not find the file in any blacklists or whitelists, then it will perform the following steps. First, it can optionally augment the feature vector provided by the client with other attributes that it is able to compute. These attributes can include, but not be limited to, the frequency with which the file appears in the user base and a server-side time stamp representing the first time the file was ever seen on the server.

The server then evaluates this augmented feature vector using a machine learning classifier (e.g., a Support Vector Machine, Decision Trees, Neural Networks, etc.). The client is provided with a disposition (e.g., malicious/benign) and an optional confidence rating, and the transaction is logged for future analysis.

Periodically, the server can scour through all previous logs and retrieve all feature vectors associated with files whose fingerprints are on known whitelists/blacklists. The server can create a training corpus associated with the feature vectors corresponding to fingerprints from known whitelists and blacklists (i.e., those items on the whitelists would be the "benign" subset of the corpus and those items on blacklists would on the "malicious" subset of the corpus.

A machine learning classifier (e.g., a Support Vector Machine, Decision Trees, Neural Networks, etc.) can be trained on this corpus. Note that there are several ways to initiate or "jumpstart" the system. We can begin with a data collection phase (e.g., imagine some type of silent detection capability).

Contextual Conviction Embodiment

According to one embodiment of the present invention, the client and server components would function as follows. When a client encounters a software application that it would like to classify as either malicious or benign, it would gather both data about the application that is used for traditional detection of malware together with contextual data about the system. The data gathered could include, but is not limited to, recent infection history on the system, the geographic location of the client, the Internet Protocol or IP address of the client, the virus identifiers and times associated with recent infections, and a client identifier that can be used to link transactions made by the same client on multiple occasions.

The infection history can be gathered either by a custom agent or by a third-party agent that exposes infection events. The client would transmit both traditional data about the application as well as contextual information. The data can be transported in a raw fashion or could be encoded in a way that permits efficient transmission over a network. The choice of encoding mechanism is orthogonal to the main aspects of the present invention and there are many techniques in the art for encoding data. The server receives data from the client and makes a determination about whether the application in malicious. If the application is deemed malicious or benign through traditional means like a signature that appears on a whitelist or blacklist, then the determination can be made without reference to the additional context passed by the client. If the application is suspicious on the basis of the data being sent, but not suspicious enough to warrant calling it outright malicious, then the contextual information can be considered. In one embodiment, if an application is suspicious and the machine had one or more recent infections, then the server can make a determination that the application is malicious. Once the server provides its recommendation, this information is passed back to the client, which in-turn, can apply a policy based on that recommendation. In one embodiment, if the server deems the application as malicious then the client can delete it from the system or otherwise block its installation onto the system. In a different embodiment, the client can block the application if the machine is in a more security sensitive state. For example, if the machine is currently running sensitive software like a banking application, then it is in a more security sensitive state (since a compromise could lead to direct financial loss). In this case, the client can block software that is suspicious (but not confirmed as malicious) from executing until the banking application has finished executing.

According to another embodiment of the present invention, a client-side component gathers information relevant to making a contextual conviction. In one embodiment, the client side component would simply provide a client identifier to the server. The client can optionally send one or more of the following pieces of information: a list of recent infections together with timestamps and virus identifiers associated with those infections; information about web sites the client visited recently; information about applications running on the system; information about applications installed on the system; information about which network ports are opened on the system; the client's geographic location; the clients Internet Protocol or IP address. In one embodiment, this component could be running constantly in the background collecting information and transmitting at periodic intervals to the server or transmitting it whenever an application of interest is encountered. In a varying embodiment, this component could collect information at the time that it is needed. In yet another embodiment, this component would combine information collected in the background as well as information collected at the time of interest.

According to another embodiment of the present invention, a server-side component analyzes information about an application in addition to contextual information about the machine that encountered application, and uses that information to make a determination regarding whether the application is malicious. In one embodiment, the server might choose to upgrade an otherwise suspicious application to a malicious application if the context in which it came increases the prior probability that the application is malicious. In another embodiment, a suspicious application might be deemed malicious if a recent infection were seen on the system. Although the embodiment just described involves making this determination on the server, the logic itself could be executed on the client or on some combination of the client or the server. In one embodiment, the server can reference the client's identifier as provided by the client, and use that identifier to mine the history of the client's transactions with the server. This information can be used to add context to the decision. For example, if the client had a recent transaction with the server where an application of interest that it queried about turned out to be malicious, then the server can treat that as a situation in which the prior probability that an application is malicious probability has gone up. In another embodiment, the server can use contextual information gathered from a plurality of clients. In this case, the server can use information that includes, but is not limited to the frequency with which a particular application is queried and the contexts from other clients associated with those queries.

According to another embodiment of the present invention, a method is executed on a client system for collecting contextual data that pertains to helping identify whether an application is malicious or benign. The method comprises the following steps, each of which is optional. First, obtain a client identifier that can be used to associate transactions from the same system. In one embodiment, this identifier can be a Global Unique Identifier (or GUID). In an alternate embodiment, this identifier can be constructed by a server at the time the client is initialized and passed to the client. The client, in-turn, would store this data in some form of non-volatile storage. Second, record any malicious threats identified either using a custom agent or using a third-party agent that have been identified on the system together with information about the time those threats entered the system. In the context of Anti-Malware technology, threats can be identified by a Virus ID, a generic fingerprint, a SHA-256, or some combination thereof. Typically, a Virus ID would yield the most generic labeling of the threat and a SHA 256 would yield the most specific labeling (identifying only that one threat). A generic fingerprint would provide a level of specificity in between these two ends. Third, record any web sites the user has visited. Fourth, record any software applications the user installed within a specified time window. Fifth, record any applications that were running at the time the application of interest (that is, the application whose disposition we are interested in) was introduced. Sixth, capture information about the client's Internet Protocol (or IP) address. Seventh, capture information about the client's netblock. Eight, capture information about the client's geographic location. Ninth, capture information about the language being used on the client system. Tenth, capture information about the network ports open on the system. Eleventh, capture information about what applications are running on the system. Twelfth, capture information about how the application of interest arrived on the system. This information includes, but is not limited to, the software application it might have arrived through, such as a web browser; the location the file came from, such as from a web site, a CD Rom, or a USB drive. Thirteenth, what rights the application of interest is looking to obtain, such as whether it would like to run under administrative privileges. Fourteenth, the web sites that the user is currently browsing when queried about the application of interest. Fifteenth, the current state of the application, such as whether the application is executing on the system or whether it is dormant. It should be borne in mind that not all of these pieces of information are compulsory, and that they may even be redundant. The list is included to elucidate the different aspects of the invention. For example, if the client sends just an identifier together with data about the application of interest to the server, then the server can use knowledge of the client's previous transactions and previous requests for applications of interest to formulate contextual information. In particular, the server can determine which applications of interest the client queried for previously, when it queried for those applications, which of those applications were deemed to be malicious, and if applicable what threats those applications corresponded to. From this information, the client's infection history can be constructed. Similarly, the server can obtain information about the client's Internet Protocol address and, as a result, information about the geographic location of the client, but using information included as part of the network protocol used by the client to communicate with the server. Specifically, if the protocol used were the Transmission Control Protocol/Internet Protocol (TCP/IP), then the Internet Protocol address is automatically included.

According to another embodiment of the present invention, a method is provided for using contextual information together with relevant metadata about an application of interest to make a final determination about whether that application is malicious or benign. The method comprises the following steps. First, a traditional evaluation of the application of interest is performed. If the application is deemed conclusively benign or conclusively malicious, then this information, together with a recommendation can be provided to the client. If the application's disposition is unknown, the gathered data about the application as well as the contextual information provided is analyzed. In one embodiment, if the gathered data as well as the contextual information can be used as a feature vector for a machine learning system, then the results of the machine learning classifier can be applied. To label the examples in such a corpus, one might have to appeal to either traditional techniques or to manual analysis of the executables. However, this process is suggested as a way to "jumpstart" the operations. The labeling of examples for the building of a training corpus can be done in any number of ways known to persons of ordinary skill in the art. Once a sufficient number of feature vectors have been labeled in conjunction with a file, a machine learning classifier can be trained as described in the machine learning embodiment described herein. The result would be a "model" that can then be applied to new (unclassified) instances.

According to another embodiment, if the gathered data indicates that the application is suspicious and the machine has a recent history of infections, the application can be deemed malicious. In another embodiment, if the contextual information suggests that the machine's security position is compromised, then more aggressive detection capabilities can be applied.

These detection capabilities can include, but are not limited to, the following: generic fingerprints of malicious applications that catch variations of threats, but that may be more prone to false positives; aggressive machine learning classifiers that can catch threats based on generic characteristics; and fingerprints of software samples that are likely to be malicious, but which have not been scrutinized yet. Contextual information that may be indicative of a machine's security position being compromised can include, but is not limited to, the following: recent infections on the system; visiting web sites that have been discovered to be compromised (where a list of such sites as well as techniques for identifying such sites are orthogonal to the disclosed invention); and installing software applications that are considered risky, such as a peer-to-peer file sharing client. In addition, some contextual information can be useful in determining if a machine is potentially at risk of being compromised. Such contextual information can include, but is not limited to the following: the presence of software applications that have known security vulnerabilities; and the presence of software applications, such as web browsers, that can be used as a conduit by attackers wishing to download threats onto the system. In another embodiment, if the contextual data suggests that a security sensitive application, such as a banking application, is running on the system, then a recommendation can be made to suspend the application of interest temporarily if it is deemed even remotely suspicious. The premise is that under such circumstances, the risk of a false positive is tolerable given the cost of becoming potentially compromised. In another embodiment, if the contextual information indicates a client is coming from or operating in a specific geographic region, then detection capabilities associated with threats from that region can be applied. For example, the Bancos Trojan is a known malware threat that targets users in Brazil (specifically focusing on stealing information associated with Brazilian bank accounts). If the computer system being protected is located in Brazil, a more aggressive technique for identifying Bancos can be applied. This technique could be, for example, a machine learning classifier that was trained specifically to identify Bancos. In a related embodiment, if the contextual information indicates that the user visited specific web sites, then aggressive techniques that identify threats associated with those web sites can be applied. As in the foregoing example, if a user visits a banking web site that coincides with the list of targets of the Bancos Trojan, then detection capabilities can be applied for Bancos. Along similar lines, if a user visits a site like Facebook, then detection capabilities for a threat like the Koobface worm can be applied.

Example 3

This example is intended to illustrate one aspect of the invention to help clarify the invention by walking through one possible implementation. It should not be viewed as limiting the scope of the invention in any way.

Agent software (part of the invention) is running on a client system (e.g., a laptop or desktop PC). The software monitors for the presence of security-related events. For example, the agent software might implement a Microsoft Windows minifilter driver that monitors file access. Whenever a new file is created on the file system, it will analyze that file to see if it is malicious using traditional techniques (such as blacklisting). This process can take place by querying a remote service hosted elsewhere (e.g., a "Cloud-based" service).

On the back end, whenever such a query is received, several methods can be applied to determine if the application is malicious. These methods can involve heuristic approaches as well as blacklisting approaches. If a file is determined to be conclusively malicious (without needing any more evidence), the result can be returned back to the client (and the transaction can be logged for future processing).

If the file is not conclusively malicious, but is still suspicious (e.g., based on heuristics the file has a 70% chance of being malicious), then additional contextual information is examined. For example, if the system on which this file resides has recently installed a peer-to-peer file sharing client and has had three conclusively malicious files in the last day, then the new file may be labeled as conclusively malicious (instead of just treating it as suspicious).

The main idea is to leverage the additional context of recent infections on the system to help tip the scales. In this case, the rule was fairly simple (3 recent infections and the installation of a peer-to-peer file sharing application). However, more sophisticated rules could be applied. Moreover, machine learning techniques can be used to create rules (or models that effectively encode rules).

Combined Embodiment

According to a combined embodiment of the invention, two or more of the above-described embodiments are performed in conjunction, or separately, at either or both of a client application and a server application. In other words, two or more of the following a) generic signatures, b) contextual convictions, and 3) machine learning derived model, are applied to determine whether a software application is malicious. According to this embodiment, a client application may perform two or more of the following steps: (i) extract a feature vector from said software application; (ii) extract metadata about the application and gather contextual information about a system on which the application may be installed; and (iii) computing a generic fingerprint for the application; then transmit the information related to data obtained to a server application. Once the server application process the information it will transmit a determination or related information back to the client application, and the client application may take an action with respect to the application based on the information received from the server component.

Correspondingly, the server application may receive from a client application two or more of the following: (i) a feature vector from said software application; (ii) metadata about the application and contextual information about a system on which the application may be installed; and (iii) a generic fingerprint for the application. If feature vector information is received from the client application the server application will apply a machine-learning derived classification algorithm to a feature vector; if metadata concerning the software application and contextual information about the client system is received, the server application will examine this data; and if a generic signature for the software application is received, the server application will determine whether the generic signature should be deemed malicious. The server application may make a determination as to whether the software application should be deemed malicious based on one or more of the foregoing assessments and transmit information concerning the determination as to whether the software application should be deemed malicious to the client application.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

Figure 15:
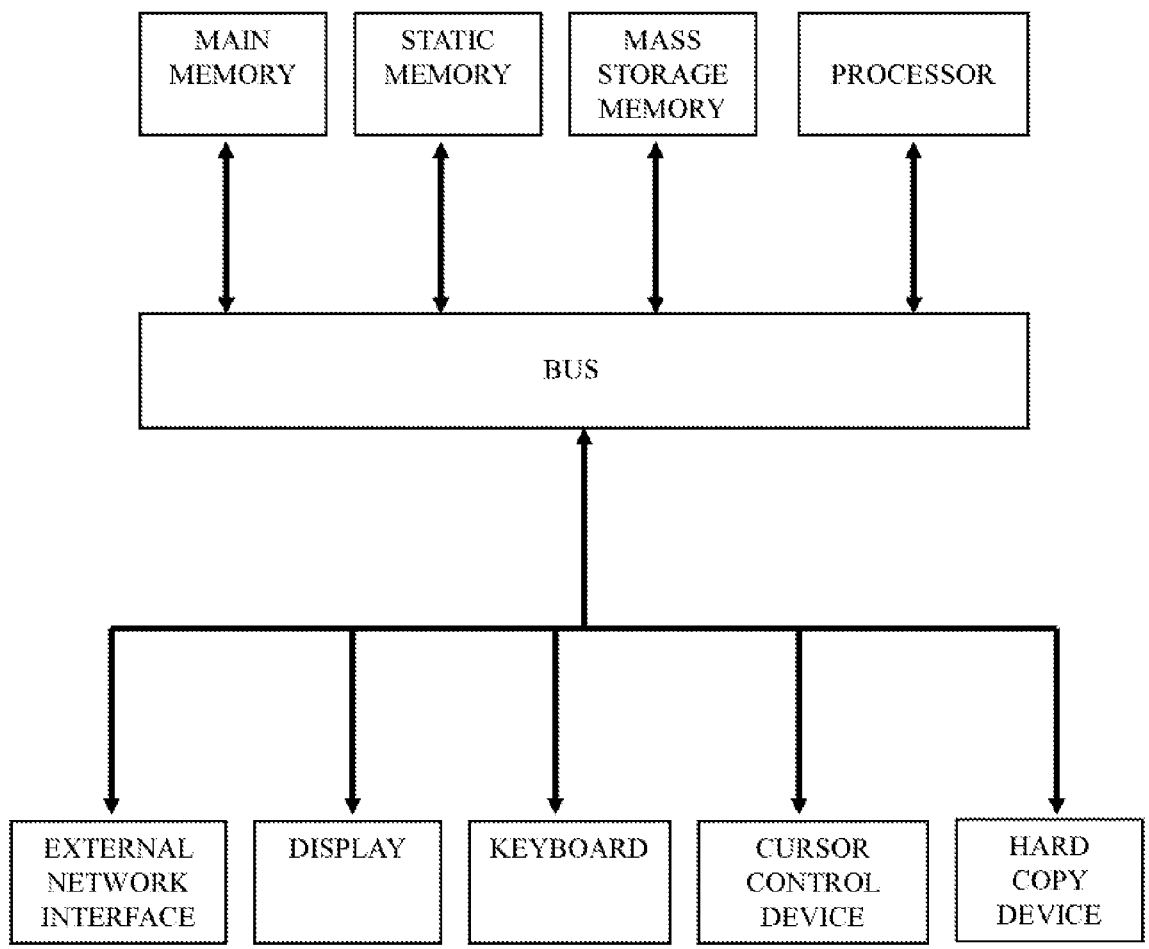
FIG. 15 is a representation of an exemplary computer system according to an embodiment of the invention.

FIG. 15 is a block diagram of an exemplary computer system that may perform one or more of the operations described herein. Referring to FIG. 15, the computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc. The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system also comprises a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (CD), coupled to the bus for displaying information to a computer user. An alphanumeric input device, including alphanumeric and other keys, may also be coupled to the bus for communicating information and command selections to the processor. An additional user input device is cursor control, such as a mouse, trackball, track pad, stylus, or cursor direction keys, coupled to the bus for communicating direction information and command selections to the processor, and for controlling cursor movement on the display. Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

The invention claimed is:

1. A computer implemented method for determining whether a software application is malicious, comprising:
   extracting a feature vector from said software application;
   transmitting said feature vector from said software application to a server application;
   receiving information from said server application relating to a determination as to whether the software application is benign or malicious based, at least in part, on said feature vector;
   extracting metadata about the software application and gathering contextual information about a system on which the software application may be installed;
   transmitting said metadata and contextual information to said server application, wherein the contextual information comprises websites visited by a client system and a geographic location of the client system;
   receiving information from said server application relating to a determination as to whether the software application is benign or malicious based, at least in part, on said metadata and contextual information;
   computing a generic fingerprint for the software application;
   transmitting said generic fingerprint to said server application; and
   receiving information from said server application relating to a determination as to whether the software application is benign or malicious based, at least in part, on said generic fingerprint; and
   performing an action with respect to the software application based on the information received from the server application and that was generated based on the feature vector, the metadata, the contextual information, and the generic fingerprint.

2. A computer implemented method for determining whether a software application is malicious, comprising:
   receiving at a server application information from a client application concerning:
      (i) a feature vector from said software application;
      (ii) metadata about the application and contextual information about a system on which the software application may be installed, wherein the contextual information comprises websites visited by a client system and a geographic location of the client system; and
      (iii) a generic fingerprint for the software application;
   applying a machine-learning derived classification algorithm to the feature vector, if feature vector information is received from the client application;
   examining metadata concerning the software application and contextual information about the client system, if metadata and contextual information are received from the client system;
   determining whether the generic signature should be deemed malicious, if a generic signature for the software application is received from the client application; and
   making a determination as to whether the software application should be deemed malicious with regard to the client application; and
   transmitting to the client application information generated based on the feature vector, the metadata, the contextual information, and the generic fingerprint and concerning the determination as to whether the software application should be deemed malicious.

3. The computer implemented method according to claim 2, wherein said metadata is selected from the group consisting of traditional fingerprints and generic signatures.

4. The computer implemented method according to claim 2, wherein said server application and said client application reside on separate and remote computing devices.

5. The computer implemented method according to claim 2, wherein said client application continuously gathers contextual information.

6. Non-transitory computer readable storage medium containing instructions for making a determination concerning whether a software application is malicious, said instructions comprising instructions for:
   extracting a feature vector from said software application;
   transmitting said feature vector to a server application;
   receiving information from said server application relating to a determination as to whether the software application is benign or malicious based, at least in part, on said feature vector;
   extracting metadata about the software application and gathering contextual information about a system on which the software application may be installed;
   transmitting said metadata and contextual information to the server application;
   receiving information from said server application relating to a determination as to whether the software application is benign or malicious based, at least in part, on said metadata and contextual information, wherein the contextual information comprises websites visited by a client system and a geographic location of the client system;
   computing a generic fingerprint for the software application;
   transmitting said generic fingerprint to said server application; and receiving information from said server application relating to a determination as to whether the software application is benign or malicious based, at least in part, on said generic fingerprint; and performing an action with respect to the software application based on the information received from the server application and that was generated based on the feature vector, the metadata, the contextual information, and the generic fingerprint.

7. Non-transitory computer readable storage medium containing instructions for making a determination concerning whether a software application is malicious, said instructions comprising instructions for:

receiving at a server application information from a client application concerning:

(i) a feature vector from said software application;

(ii) metadata about the software application and contextual information about a system on which the software application may be installed, wherein the contextual information comprises websites visited by a client system and a geographic location of the client system; and (iii) a generic fingerprint for the software application;

applying a machine-learning derived classification algorithm to the feature vector, if feature vector information is received from the client system;

examining metadata concerning the software application and contextual information about the client system, if metadata and contextual information are received from the client system;

determining whether the generic signature should be deemed malicious, if a generic signature for the software application is received from the client system;

making a determination as to whether the software application should be deemed malicious with regard to the client application; and transmitting to the client application information generated based on the feature vector, the metadata, the contextual information, and the generic fingerprint and concerning the determination as to whether the software application should be deemed malicious to.

8. The non-transitory computer readable storage medium according to claim 7, wherein said metadata is selected from the group consisting of traditional fingerprints and generic signatures.

9. The non-transitory computer readable storage medium according to claim 7, wherein said server application and said client application reside on separate and remote computing devices.

10. The non-transitory computer readable storage medium according to claim 7, wherein said client application continuously gathers contextual information.

* * * * *